(12) United States Patent
Paydarfar et al.

(10) Patent No.: US 12,458,807 B2
(45) Date of Patent: Nov. 4, 2025

(54) APPARATUS AND METHODS FOR PHASE-AGNOSTIC STIMULI

(71) Applicant: Research Development Foundation, Carson City, NV (US)

(72) Inventors: David Paydarfar, Austin, TX (US); Joshua Chang, Pflugerville, TX (US); Sara A. Santos, Austin, TX (US); Varun K. Sridhar, Austin, TX (US)

(73) Assignee: Research Development Foundation, Carson City, NV (US)

( * ) Notice: Subject to any disclaimer, the term of this patent is extended or adjusted under 35 U.S.C. 154(b) by 138 days.

(21) Appl. No.: 17/506,019

(22) Filed: Oct. 20, 2021

(65) Prior Publication Data

US 2022/0143412 A1 May 12, 2022

Related U.S. Application Data

(60) Provisional application No. 63/114,636, filed on Nov. 17, 2020, provisional application No. 63/104,998, filed on Oct. 23, 2020.

(51) Int. Cl.

| | |
|---|---|
| *A61N 1/00* | (2006.01) |
| *A61N 1/05* | (2006.01) |
| *A61N 1/36* | (2006.01) |
| *A61N 1/378* | (2006.01) |
| *G01R 25/00* | (2006.01) |
| *G16H 20/00* | (2018.01) |

(52) U.S. Cl.
CPC .......... *A61N 1/378* (2013.01); *A61N 1/0534* (2013.01); *A61N 1/36114* (2013.01); *A61N 1/36125* (2013.01); *A61N 1/36146* (2013.01); *G01R 25/005* (2013.01); *G16H 20/00* (2018.01)

(58) Field of Classification Search
None
See application file for complete search history.

(56) References Cited

U.S. PATENT DOCUMENTS

| | | | |
|---|---|---|---|
| 5,421,817 A * | 6/1995 | Liss | A61N 1/36021 604/20 |
| 10,506,983 B2 | 12/2019 | Paydarfar et al. | |
| 2002/0165586 A1* | 11/2002 | Hill | A61N 1/36114 607/9 |
| 2006/0102171 A1* | 5/2006 | Gavish | A61B 5/4818 128/95.1 |

(Continued)

FOREIGN PATENT DOCUMENTS

WO WO2019/153094 8/2019

OTHER PUBLICATIONS

Extended European Search Report for Application No. EP21883753.2 dated Mar. 4, 2024, 9 pages.

(Continued)

*Primary Examiner* — Michael W Kahelin
*Assistant Examiner* — Anant A Gupta
(74) *Attorney, Agent, or Firm* — pH IP LAW

(57) ABSTRACT

Apparatus and methods for applying a phase-agnostic stimuli are disclosed herein. Certain embodiments include methods and apparatus that are configured to receive a detected signal from a subject and transmit a stimulation signal that is configured to optimize a response signal without regard to the phase of the detected signal.

17 Claims, 14 Drawing Sheets
(9 of 14 Drawing Sheet(s) Filed in Color)

(56) References Cited

U.S. PATENT DOCUMENTS

| | | |
|---|---|---|
| 2007/0156179 A1 | 7/2007 | S. E. |
| 2008/0269836 A1* | 10/2008 | Foffani ............... A61N 1/3605 607/45 |
| 2009/0204164 A1 | 8/2009 | Efimov et al. |
| 2012/0078323 A1 | 3/2012 | Osorio |
| 2012/0277618 A1* | 11/2012 | Giftakis ............... A61B 5/4094 600/300 |
| 2013/0204319 A1* | 8/2013 | Trier ................. A61N 1/36146 607/46 |
| 2014/0350634 A1* | 11/2014 | Grill .................... A61B 5/4836 607/45 |
| 2017/0001018 A1* | 1/2017 | Archer ............... A61N 1/36125 |
| 2018/0192961 A1* | 7/2018 | Paydarfar ............ A61B 5/7203 |
| 2019/0131951 A1 | 5/2019 | Keskinen |
| 2019/0160287 A1* | 5/2019 | Harrer .................. G16H 10/60 |
| 2019/0290912 A1 | 9/2019 | Raike et al. |
| 2020/0104680 A1 | 4/2020 | Reed et al. |

OTHER PUBLICATIONS

International Search Report and Written Opinion for PCT/US2021/055725 dated Jan. 14, 2022, 23 pages.

International Preliminary Report on Patentability for PCT/US2021/055725 dated Apr. 13, 2023, 15 pages.

Chang et al., "Falling off a limit cycle using phase-agnostic stimuli: Definitions and conceptual framework", *Chaos: An Interdisciplinary Journal of Nonlinear Science*, 30, 123113, 2020.

Chang et al., "Falling off a limit cycle using phase-agnostic stimuli: Applications to clinical oscillopathies", *Chaos*, 31, 023134, 2021, 2021.

Chang et al., "Optimizing stimulus waveforms for electroceuticals", *Biological Cybernetics*, 113, 191-199, 2019.

\* cited by examiner

APPARATUS AND METHODS FOR PHASE-AGNOSTIC STIMULI

CROSS-REFERENCE TO RELATED APPLICATIONS

This application claims the benefit of U.S. Provisional Patent Application Nos. 63/104,998, filed Oct. 23, 2020, and 63/114,636, filed Nov. 17, 2020, the entirety of each of which is incorporated herein by reference.

BACKGROUND INFORMATION

For over a century, physiological studies have shown how precisely timed pulses can switch off a biological oscillator. This empiric finding has shaped our mechanistic understanding of how perturbations start, stop, and reset biological oscillators, and has led to treatments that suppress pathological oscillations using electrical pulses given within specified therapeutic phase windows. Here the inventors present evidence, using numerical simulations of models of bistable biological oscillators, that the phase window can be opened to the entire cycle using novel complex stimulus waveforms. The results reveal how trajectories are displaced by such phase-agnostic stimuli off the oscillator's limit cycle and corralled into a region where oscillation is suppressed, irrespective of the phase at which the stimulus was applied. The findings suggest the need for broadening theoretical understanding of how complex perturbing waveforms interact with biological oscillators to access their arrhythmic states. In clinical practice, oscillopathies may be treated more effectively with non-traditional stimulus waveforms that obviate the need for phase-specificity.

Oscillatory dynamics are pervasive in biology and medicine, regulating vital physiological processes with cyclic activities across broad time scales. The mechanisms by which perturbing signals start, stop, and reset biological rhythms provide insights into key regulatory principles governing normal neural, cardiac and metabolic states, as well as pathogenesis of aberrant oscillations, for example, rhythmic neuronal firing underlying epileptic seizures 1-3 and parkinsonian tremors [4-6], and ectopic pacemaker automaticity underlying ventricular tachyarrhythmias and fibrillation [7,8]. Many oscillatory pathologies might be amenable to treatments that exploit the nonlinear dynamics of the disease state, in which relatively small inputs can switch off the undesirable oscillations. Conversely, vital oscillators essential for survival must be resistant to perturbations that suppress rhythmicity except when necessary for survival—for example, rapidly halting breathing rhythmicity during diving or swallowing.

For over a century, physiological studies have shown how precisely timed pulses can switch off an oscillator. Mines was among the first to report this phenomenon in isolated perfused heart preparations, in which a relatively mild and brief myocardial electrical stimulus could induce ventricular fibrillation if the stimulus was applied at a specific phase of the cardiac cycle, called the vulnerable phase [9]. Stimuli given at other phases caused only transient alterations followed by resumption of the normal cardiac rhythm, with its phase reset relative to the pre-stimulus period. The phenomenon of stimulus-induced suppression of rhythm has been described in many other neural [10-13], cardiac [14-17], circadian [18-20] and biochemical 21 experiments. In all cases the arrhythmia-inducing effect of the stimulus is phase-specific, i.e., the stimulus must be given within a narrow range of phases within the cycle to cause the effect.

Winfree provided a theoretical and experimental framework for classifying phase resetting and annihilation of biological rhythms [18,22-24]. Responses to discrete perturbations are the basis of analysis, with a key insight that critical stimuli can expose an oscillator's "physiological black hole" using the "singularity trap", an experimental protocol revealing the precise phase and intensity of stimuli that suppress oscillation. In dynamical systems theory, these notions arise for a class of oscillators in which a stable limit cycle (with locally convergent trajectories) co-exists with a region bounding a phaseless set [25].

Critical phase-specific perturbations cause displacement off the limit cycle to a region in which trajectories exhibit arrhythmicity. The required precision of the applied stimulus, the exact combinations of stimulus phase and strength that perturbs the stable limit cycle into the phaseless set, is highly dependent upon intrinsic properties of the oscillator [23]. For example, in mathematical models of neuron oscillators, changing a single bifurcation parameter—the leak current—can shrink or expand the region bounding the phaseless set [26]. Experimentally, this would narrow or widen the oscillator's phase window, i.e. the range of phases within the cycle at which stimuli can switch off stable rhythmicity of the oscillator. It is important to note that an oscillators' arrhythmic state might be highly constricted or unstable, rendering it difficult or impossible to switch off the oscillation using phase-specific stimuli [23,27].

Therefore, previous research on biological oscillators suggests that in order to suppress rhythm by perturbing an oscillator to its stable arrhythmic state using simple pulses, the stimulus should be applied within a narrow phase window. Can other waveforms open the phase window of such systems, causing the oscillator to switch off when the stimulus is applied across larger phase segments, or even irrespective of phase? The current study seeks to open the phase window for switching off model biological oscillations using novel stimulus waveforms. The inventors use a stochastic optimization algorithm to search for stimulus profiles that maximize the phase interval within which stimulus initiation successfully perturbs the limit cycle to the arrhythmic state. First, the inventors analyze a two-dimensional model of cellular excitation, the FitzHugh-Nagumo model [28,29], with parameters adjusted such that the phaseless set, bounded by an unstable limit cycle, is a very small focus relative to the basin of attraction to the stable limit cycle. The inventors then investigate higher-dimensional clinically inspired models of epilepsy and ventricular tachyarrhythmias. In all studied cases, the inventors find unique stimulus waveforms, in which the perturbing waveform switches off the oscillation when the stimulus is applied at any phase of the stable limit cycle. The findings suggest the need for broadening theoretical understanding of how complex perturbing waveforms interact with biological oscillators to access their arrhythmic states, and raise the possibility that in clinical practice, oscillopathies may be treated more effectively with non-traditional stimuli that obviate the need for phase-specificity.

SUMMARY

Briefly, the present disclosure provides devices, methods, and systems for phase-agnostic stimuli, including waveforms generated via a programmable arbitrary waveform generator.

Certain embodiments include an apparatus for applying a therapeutic treatment to a subject, the apparatus comprising a stimulation electrode and a programmable arbitrary waveform generator. In particular embodiments, the programmable arbitrary waveform generator is configured to: receive a detected signal from the subject; transmit a first stimulation signal to the subject via the stimulation electrode, wherein the first stimulation signal is transmitted at a phase of the detected signal; receive a response signal from the subject; and transmit a second stimulation signal to the subject via the stimulation electrode, wherein the second stimulation signal is configured to optimize the response signal without regard to the phase of the detected signal.

In some embodiments, the detected signal is received from a detection electrode, and in specific embodiments the detection electrode is a separate component coupled to the apparatus. In certain embodiments the detection electrode is integral to the apparatus, and in particular embodiments the programmable arbitrary waveform generator is configured to: transmit a third stimulation signal via the stimulation electrode; receive a second response signal from the subject; and transmit a fourth stimulation signal, to the subject via the stimulation electrode, wherein the fourth stimulation signal is configured to optimize the second response signal without regard to the phase of the detected signal.

In some embodiments the programmable arbitrary waveform generator is configured to apply subsequent stimulation signals and receive subsequent response signals in an iterative process. In specific embodiments the second stimulation signal is generated using an extrema distortion algorithm. In certain embodiments the second stimulation signal is generated using a deep learning algorithm. In particular embodiments the second stimulation signal is generated using a reinforcement learning algorithm. In some embodiments the first stimulation signal and the second stimulation signal are complex waveforms. In specific embodiments the first stimulation signal and the second stimulation signal are deep brain stimulation signals. In certain embodiments the deep brain stimulation signals are directional deep brain stimulation signals.

In particular embodiments the deep brain stimulation signals are configured for treatment of Parkinson's disease, for treatment of epilepsy or a seizure disorder, and/or for treatment of absence seizures, tonic seizures, atonic seizures, clonic seizures, myoclonic seizures, or tonic-clonic seizures. In some embodiments the first stimulation signal and the second stimulation signal are cardiac stimulation signals, and in specific embodiments the cardiac stimulation signals are configured for treatment of a cardiac arrythmia.

Certain embodiments include an apparatus for applying a therapeutic treatment to a subject, the apparatus comprising: a detection module; a transmission module; and a waveform generator. In particular embodiments he waveform generator is configured to: receive a detected signal from the subject via the detection module; transmit a first stimulation signal to the subject via the transmission module; receive a first response signal from the subject via the detection module; transmit a second stimulation signal to the subject via the transmission module; and receive a second response signal from the subject via the detection module. In specific embodiments the second stimulation signal is configured to optimize the first response signal, and the first stimulation signal and the second stimulation signal are applied in a phase agnostic manner.

Certain embodiments include a method of treating a disease in a mammalian subject, the method comprising: receiving an oscillating electrical signal from a subject; applying a first stimulation signal to the subject at a phase window of the oscillating electrical signal, wherein the first stimulation signal modifies the oscillating electrical signal from the subject to produce a response signal; receiving the response signal from the subject; and applying a second stimulation signal to the subject, wherein the second stimulation signal is configured to optimize the response signal without regard to the phase window of the oscillating electrical signal. In particular embodiments, the method further comprises: applying a third stimulation signal to the subject at a phase window of the oscillating electrical signal, wherein the third stimulation signal modifies the oscillating electrical signal from the subject to produce a second response signal; receiving the second response signal from the subject; and applying a fourth stimulation signal to the subject, wherein the fourth stimulation signal is configured to optimize the second response signal without regard to the phase window of the oscillating electrical signal.

Some embodiments further comprise applying subsequent stimulation signals and receiving subsequent response signals in an iterative process. In specific embodiments the disease is epilepsy, Parkinson's disease or a seizure disorder. In certain embodiments the seizure disorder is characterized by absence seizures, tonic seizures, atonic seizures, clonic seizures, myoclonic seizures, or tonic-clonic seizures. In particular embodiments the disease is a cardiac arrythmia. In some embodiments the subject is a human.

Certain embodiments include a method of applying a therapeutic treatment to a subject, comprising: applying an electrical stimulation to the subject; receiving feedback from the subject in response to said electrical stimulation; adjusting said electrical stimulation based at least in part on said feedback, where the adjustment includes a change of the electrical stimulation waveform and comprises one or more of a change to phase, amplitude, timing, duration, shape; and applying the adjusted electrical stimulation to the subject. In particular embodiments, the adjusting comprises searching for a waveform change using a stochastic optimization algorithm, and in some embodiments the stochastic optimization algorithm comprises an extrema distortion algorithm.

In specific embodiments the adjusted electrical stimulation is phase agnostic, and in certain embodiments the adjusting comprises applying a machine learning process using the feedback. In particular embodiments, the adjusting comprises applying a reinforcement learning process where a reward is based on the feedback to adjust the electrical stimulation. Some embodiments comprise repeating the receiving, adjusting and applying steps until the applied electrical stimulation reliably triggers a biological oscillation in the subject. In specific embodiments, the adjusting comprises searching for a waveform change using a deep reinforcement learning algorithm. In certain embodiments the deep reinforcement learning algorithm is a deep deterministic policy gradients (DDPG) algorithm comprising an actor network and a critic network. In particular embodiments applying an electrical stimulation to the subject comprises an action space in the DDPG algorithm and the receiving feedback from the subject comprises an observation space in the DDPG algorithm.

In some embodiments receiving feedback comprises observing a response voltage. Specific embodiments further comprise generating a positive reward if the response voltage exceeds an action potential trigger value. Certain embodiments further comprise generating a negative award based on an energy of the electrical stimulation. Particular embodiments further comprise adjusting parameters of the action space and the action potential trigger value. In some embodiments adjusting the parameters of the action space and the action potential trigger value reduces actor drift within the action space. In specific embodiments the subject is a mammal, and wherein the electrical stimulation is administered to the central nervous system of the subject. In certain embodiments the electrical stimulation is administered to the spinal cord of the subject. In particular embodiments the method comprises treating pain in the subject. In some embodiments the electrical stimulation is administered to the brain of the subject.

In specific embodiments the method comprises treating a neurological disorder or a neurological disease in the subject, and in certain embodiments the neurological disorder or neurological disease is Parkinson's Disease (PD), a seizure disorder, essential tremor, dystonia, epilepsy, obsessive compulsive disorder (OCD), major depression disorder, Alzheimer's disease, or traumatic brain injury. In certain embodiments, the neurological disorder or neurological disease is Parkinson's Disease.

In particular embodiments the electrical stimulation is applied to the subthalamic nucleus (STN), globus pallidus internus (GPi), ventral intermediate nucleus, posterior subthalamic area, and/or the pedunculopontine nucleus of the subject. In some embodiments the subject is a human. In specific embodiments the electrical stimulation is administered to a vagus nerve of the subject. In certain embodiments the method comprises treating an autoimmune or inflammatory condition in the subject. In particular embodiments the autoimmune or inflammatory condition is rheumatoid arthritis or Crohn's disease. In some embodiments the electrical stimulation is administered to a gastric nerve of the subject. In specific embodiments the method comprises treating obesity.

Certain embodiments include a method of applying a therapeutic treatment to a subject with multiple electrical stimulations, comprising: operatively connecting multiple electrodes to a subject where an electrical stimulation can be applied to a number of electrodes and a response can be received from a number of electrodes; applying an electrical stimulus to a plurality of the electrodes where the applied stimulus comprises a different waveform applied to two or more electrodes; recording a plurality of responses received from a plurality of electrodes responsive to the applied electrical stimulus; adjusting the electrical stimulus based on the recorded responses to resolve a new electrical stimulus comprising a matrix of outputs; and applying the new electrical stimulus to a number of electrodes.

In particular embodiments the treatment is a directional deep brain stimulus (dDBS) and the electrodes are operatively coupled to the subject's brain environment. In some embodiments the dDBS comprises minimal stimulation applied to a number of electrodes and optimized waveforms applied to a number of electrodes. In specific embodiments the adjustment in output waveform comprises one or more of a change to pulse, amplitude, timing, duration, shape. In certain embodiments the different waveforms applied to two or more electrodes are independent. Particular embodiments include adjusting the electrical stimulus based on the recorded responses comprising searching for a waveform optimization using a stochastic optimization algorithm. In certain embodiments, adjusting the electrical stimulus based on the recorded responses comprises searching for a waveform optimization using reinforcement learning. In particular embodiments, the new electrical stimulation is phase agnostic.

Exemplary embodiments of the present disclosure include an apparatus for applying a therapeutic treatment to a subject. In certain aspects, the apparatus comprises a first electrode, a second electrode and a programmable arbitrary waveform generator. In particular aspects the programmable arbitrary waveform generator is configured to: receive a detected signal from the subject via the first electrode; transmit a first stimulation signal to the subject via the second electrode, wherein the first stimulation signal is transmitted at an initial phase of the detected signal; receive a response signal from the subject via the first electrode; and transmit a second stimulation signal to the subject via the second electrode, wherein the second stimulation signal is configured to optimize the response signal without regard to the initial phase of the detected signal.

In some aspects, the second stimulation signal is generated using an extrema distortion algorithm. In specific aspects, the second stimulation signal is generated using a deep learning algorithm. In certain aspects, the second stimulation signal is generated using a reinforcement learning algorithm.

In particular aspects, the first stimulation signal and the second stimulation signal are complex waveforms. In some aspects, the first stimulation signal and the second stimulation signal are deep brain stimulation signals. In specific aspects, the deep brain stimulation signals are directional deep brain stimulation signals. In certain aspects, the deep brain stimulation signals are configured for treatment of Parkinson's disease. In particular aspects, the deep brain stimulation signals are configured for treatment of epilepsy or a seizure disorder. In some aspects, the deep brain stimulation signals are configured for treatment of absence seizures, tonic seizures, atonic seizures, clonic seizures, myoclonic seizures, or tonic-clonic seizures. In specific aspects, the first stimulation signal and the second stimulation signal are cardiac stimulation signals. In certain aspects, the cardiac stimulation signals are configured for treatment of a cardiac arrythmia.

Exemplary embodiments of the present disclosure include an apparatus for applying a therapeutic treatment to a subject, where the apparatus comprises: a detection module; a transmission module; and a waveform generator. In certain aspects, the waveform generator is configured to: receive a detected signal from the subject via the detection module; transmit a first stimulation signal to the subject via the transmission module; receive a first response signal from the subject via the detection module; transmit a second stimulation signal to the subject via the transmission module; and receive a second response signal from the subject via the detection module. In particular aspects, the second stimulation signal is configured to optimize the first response signal, and the first stimulation signal and the second stimulation signal are applied in a phase agnostic manner.

Exemplary embodiments of the present disclosure include a method of treating a disease in a mammalian subject. In certain aspects, the method comprises: receiving an oscillating electrical signal from a subject; applying a first stimulation signal to the subject at an initial phase window of the oscillating electrical signal, where the first stimulation signal modifies the oscillating electrical signal from the subject to produce a response signal; receiving the response signal from the subject; and applying a second stimulation signal to the subject, where the second stimulation signal is configured to optimize the response signal without regard to the initial phase window of the oscillating electrical signal.

In particular aspects, the disease is epilepsy or a seizure disorder. In some aspects, the disease is Parkinson's disease. In specific aspects, the disease is epilepsy or a seizure disorder. In certain aspects, the seizure disorder is characterized by absence seizures, tonic seizures, atonic seizures, clonic seizures, myoclonic seizures, or tonic-clonic seizures.

In particular aspects, the disease is a cardiac arrythmia. In certain aspects, the subject is a human.

Other objects, features and advantages of the present invention will become apparent from the following detailed description. It should be understood, however, that the detailed description and the specific examples, while indicating certain embodiments of the invention, are given by way of illustration only, since various changes and modifications within the spirit and scope of the invention will become apparent to those skilled in the art from this detailed description.

Unless defined otherwise, all technical and scientific terms used herein have the same meaning as commonly understood to one of ordinary skill in the art to which this invention belongs. Although any methods, devices and materials similar or equivalent to those described herein can be used in the practice or testing of the invention, the exemplified methods, devices and materials are now described.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. The disclosures of all patents, patent applications and publications cited herein are hereby incorporated herein by reference in their entireties, to the extent that they are consistent with the present disclosure set forth herein.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

At least a portion of embodiments discussed herein can be implemented using a computer communicatively coupled to a network (for example, the Internet), another computer, or in a standalone computer. As is known to those skilled in the art, a suitable computer can include a processor or central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, touch pad, etc.), or the like.

ROM, RAM, and HD are computer memories for storing computer-executable instructions executable by the CPU or capable of being complied or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory module or drive, an optical data storage drive, a CD-ROM, ROM, RAM, HD, or the like. Software implementing some embodiments disclosed herein can include computer-executable instructions that may reside on a non-transitory computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including the custom script. Other software/hardware/network architectures may be used. For example, the software tools and the custom script may be implemented on one computer or shared/distributed among two or more computers in or across a network. Communications between computers implementing embodiments can be accomplished using any electronic, optical, radio frequency signals, or other suitable methods and tools of communication in compliance with known network protocols. Additionally, any signal arrows in the drawings/figures should be considered only as exemplary, and not limiting, unless otherwise specifically noted. Based on the disclosure and teachings provided herein, a person of ordinary skill in the art will appreciate other ways and/or methods to implement the invention.

A "seizure" as used herein refers to a disease characterized by a paroxysmal alteration of neurologic function, or characterized by an excessive, hypersynchronous discharge of neurons in the brain. "Epileptic seizure" is used to distinguish a seizure caused by abnormal neuronal firing from a nonepileptic event, such as a psychogenic seizure. "Epilepsy" is the condition of recurrent, unprovoked seizures. Epilepsy can result from a variety of numerous causes, each reflecting underlying brain dysfunction (Shorvon et al. 2011). A seizure provoked by a reversible insult (e.g., fever, hypoglycemia) does not fall under the definition of epilepsy because it is a short-lived secondary condition, not a chronic state. "Seizure disorder" refers to a disease characterized by seizures. In some embodiments, the seizure disorder may be an "epilepsy syndrome," which refers to a group of clinical characteristics that consistently occur together, with similar seizure type(s), age of onset, EEG findings, triggering factors, genetics, natural history, prognosis, and/or response to antiepileptic drugs (AEDs).

Parkinson's disease (PD) is a progressive nervous system disorder. PD is the second most common progressive neurodegenerative disorder affecting older American adults. PD results from a pathophysiologic loss or degeneration of dopaminergic neurons in the substantia nigra of the midbrain and is typically characterized by the development of neuronal Lewy Bodies. Idiopathic Parkinson's Disease has been associated with a variety of risk factors (e.g., Beitz, 2014). PD typically includes both motor and non-motor symptoms. For example, PD patients may exhibit a tremor (e.g., at rest), muscle rigidity, bradykinesia, and/or stooping posture. PD has occasionally been associated with other neurobehavioral symptoms, such as depression, anxiety, cognitive impairment, or autonomic dysfunction (e.g., orthostasis and hyperhidrosis).

Deep brain stimulation (DBS) can be used to treat diseases such as epilepsy and PD. DBS involves the therapeutic use of repeated or chronic electrical stimulation of the brain, e.g., via an implanted electrode. It can be used to treat the motor symptoms of Parkinson's disease (PD), essential tremor, and dystonia. A variety of brain regions can be targeted for electrical stimulation via the implanted electrode. For example, to treat epilepsy, the brain region that is targeted can be the anterior thalamic nucleus (ATN), cerebellum, caudate nucleus (CN), subthalamic nucleus (STN), hippocampus, centromedian nucleus of the thalamus (CM), corpus callosum (CC), locus coeruleus (LoC), or mammillary bodies (MB). In some embodiments, the seizure focus can be targeted (e.g., using an RNS® device, Neuropace, Inc., CA, USA) for detection and stimulation at the seizure focus, and this approach is normally customized for each patient. To treat PD, DBS can be used to target the globus pallidus internus (GPi), STN, or pedunculopontine nucleus (PPN) in the brain of a subject. Additional details regarding these approaches are described, e.g., in Herrington et al., 2016.

Any embodiment of any of the present methods, composition, kit, and systems may consist of or consist essentially of—rather than comprise/include/contain/have—the described steps and/or features. Thus, in any of the claims, the term "consisting of" or "consisting essentially of" may be substituted for any of the open-ended linking verbs recited above, in order to change the scope of a given claim from what it would otherwise be using the open-ended linking verb.

The use of the term "or" in the claims is used to mean "and/or" unless explicitly indicated to refer to alternatives only or the alternatives are mutually exclusive, although the disclosure supports a definition that refers to only alternatives and "and/or."

Throughout this application, the term "about" or "approximately" is used to indicate that a value includes the standard deviation of error for the device or method being employed to determine the value.

Following long-standing patent law, the words "a" and "an," when used in conjunction with the word "comprising" in the claims or specification, denotes one or more, unless specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein, the meaning of "in" includes "in" and "on" unless the context clearly dictates otherwise.

As used herein, "patient" or "subject" includes mammalian organisms, such as human and non-human mammals, for example, but not limited to, rodents, mice, rats, non-human primates, companion animals such as dogs and cats as well as livestock, e.g., sheep, cow, horse, etc. Therefore, for example, although the described embodiments illustrate use of the present methods on humans, those of skill in the art would readily recognize that these methods and compositions could also be applied to veterinary medicine as well as on other animals.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein. The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
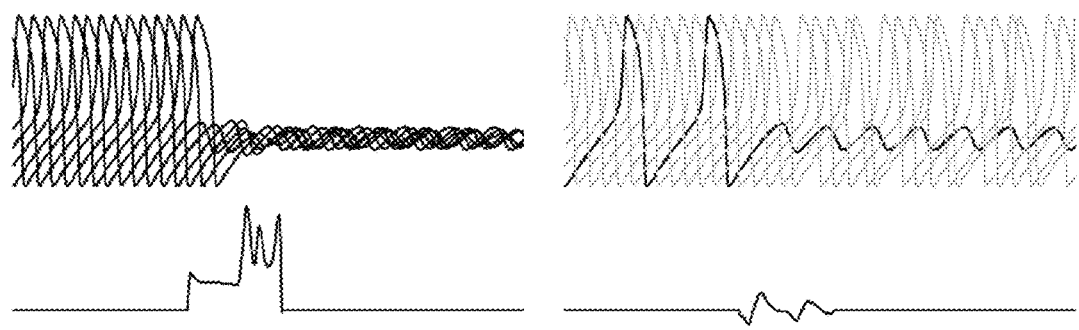
FIG. 1 illustrates a waveform capable of suppressing oscillations regardless of the phase at which the stimulus was given.

Exemplary embodiments of the present disclosure include apparatus and methods for phase-agnostic stimuli. As used herein, a stimulus waveform is phase-agnostic if it drives the oscillator to its phaseless set regardless of the phase at which the stimulus is applied. Accordingly, a phase-agnostic apparatus or method applies a stimulation signal to a detected signal in order to optimize a response signal without regard to the phase relationship between the stimulation signal and the detected signal.

The framing of this problem in a simple modified radial isochron clock is discussed below in this disclosure. Here, the inventors pose this question in four biologically relevant oscillator models.

Models

The FitzHugh-Nagumo model depicts the essential qualities of membrane excitation and propagation related to transmembrane sodium and potassium current flow 28,29. The state variables are unitless and abstract, yet they capture voltage-like and recovery dynamics. The simplicity of the FitzHugh-Nagumo model allows us to gain insight through complete visualization of the system dynamics of the two state variables. The model equations are:

$$\dot{x}_1 = c\left(x_2 + x_1 - \frac{x_1^3}{3} - r\right) + u$$

$$\dot{x}_2 = -\frac{1}{c}(x_1 - a + bx_2),$$

where u represents the stimulus. Using model parameters a=0.7, b=0.8, c=3.0, r=0.342, the system exists as an Andronov-Hopf oscillator [31] with two stable states, quiescence and repetitive firing. Model behavior was simulated in MATLAB (Mathworks; Natick, MA) using the ode113 differential equation solver. In order to examine the effect of a stimulus at different phases across one full cycle length, the inventors offset the stimulus by 0.1-ms 131 times. The inventors found optimal biphasic rectangular pulses using a grid search, as well as more complex stimulus waveforms using an extrema-based feature stochastic hillclimbing search.

In the FitzHugh-Nagumo model, the basin of attraction for the fixed point is relatively shallow. Solutions can spiral for a long time along the border of the unstable limit cycle. To be more confident of the oscillators state near the unstable limit cycle, the inventors ran the system for 100-ms, multiple cycle lengths, after the stimulus had ended.

We study a model absence seizures, developed by Suffczynski et al [32], that describes interactions of four separate populations of neurons: pyramidal neurons, interneurons, thalamocortical neurons, and reticulothalamic neurons. Model parameters are based on previously published experimental data from Wistar albino Glaxo from Rijs-wijk (WAG/Rij) rats, a genetic model of absence epilepsy. The full model in MATLAB's Simulink can be found on ModelDB. Cortical EEG activity, represented by the pyramidal neuron compartment, exhibits two distinct states: normal (spindle) activity and spike and wave discharges with cycle length of 200-ms. Stimuli with duration of 400-ms oscillation, were applied at 400 different phases across the cycle in 1-ms increments.

To study the spontaneous cycling between ictal-interictal states seen in generalized epilepsy, the inventors use the model by Jirsa et al [1] called the Epileptor model, developed from clinical and experimental animal studies. The model equations are:

$$\dot{x}_1 = y_1 - f_1(x_1, x_2) - z + I_{ext1}$$

$$\dot{y}_1 = c_1 - d_1 x_1^2 - y_1$$

-continued $$\dot{z} = \begin{cases} r[s(x_1 - x_0) - z - 0.1z^7] & \text{if } z < 0 \\ r[s(x_1 - x_0) - z] & \text{if } z \geq 0 \end{cases}$$

$$\dot{x}_2 = -y_1 + x_2 - x_2^3 + I_{ext2} + 0.002g - 0.3(z - 3.5)$$

$$\dot{y}_2 = \frac{1}{\tau_2}(-y_2 + f_2(x_2))$$

$$g = \int_{t_0}^{t} e^{-\gamma(t-\tau)} d\tau$$

$$f_1(x_1, x_2) = \begin{cases} a_1 x_1^3 - b_1 x_1^2 & \text{if } x_1 < 0 \\ -[m - x_2 + 0.6(z - 4)^2]x_1 & \text{if } x_1 \geq 0 \end{cases}$$

$$f_2(x_1, x_2) = \begin{cases} 0 & \text{if } x_2 < -0.25 \\ a_2(x_2 + 0.25) & \text{if } x_2 \geq -0.25 \end{cases}$$

with parameters $a_1=1$, $b_1=3$, $c_1=1$, $d_1=5$, $I_{ext1}=3.1$, $m=0$, $a_2=6$, $\tau_2=10$, $I_{ext2}=0.45$, $\gamma=0.01$, $r=0.00035$, $s=4$, and $x_0=-2.1$ as determined by El Houssaini et al to simulate a bistable system between a normal state and refractory status epilepticus [33]. This model has five state variables: two describing rapid discharges at a fast time scale, two describing spike and wave events at a moderate time scale, and one for the alternation between "normal" and "ictal" periods on a slow time scale. The Epileptor model has been used to explain mathematically the genesis and termination of seizure dynamics in a bistable system, mimicking experimental findings from different species. To perturb the system dynamics, the inventors used 3.5-second stimuli, equivalent to the length of one cycle of status epilepticus, sampled at 1-ms resolution.

For the last model, the inventors examine a cardiac model of reentrant tachycardia developed by Glass and Josephson [34] as defined by:

$$\frac{\partial v}{\partial t} = -w - v(v - 0.139)(v - 1) + D\frac{\partial^2 v}{\partial R^2} + I(R)$$

$$\frac{\partial w}{\partial t} = 0.008(v - 2.54w)$$

$$\frac{\partial v}{\partial t} = -w - v(v - 0.139)(v - 1) + D\frac{\partial^2 v}{\partial R^2} + I(R)$$

$$\frac{\partial w}{\partial t} = 0.008(v - 2.54w)$$

where parameters D represents the diffusion coefficient, and I(R) represents the injected current at a specific location. The model simulates an action potential traveling around a ring geometry of circumference $2\times\sqrt{5}$ cm. The diffusion coefficient is set at 1-cm²/sec. A single pulse stimulus, given within a specific phase region, suppresses the depolarizing wave propagating around the ring. The inventors applied the approach to determine if a stimulus given at a single point on the ring could suppress the rotating wave behavior regardless of where the action potential was on the ring. This model was integrated using an Euler method with dt=0.1-ms and $dR=2\times\sqrt{5}\times0.005$-cm. The initial values of the model were calculated by first creating an action potential at one point on the ring with D=0. That action potential was then mapped around the ring, and the equation was integrated forward in time until the system stabilized. The values at each point on the ring was then used as the initial conditions for further computations. The period of one cycle was 356.1-ms, and the inventors constructed a 356.1-ms stimulus sampled at 0.1-ms resolution. Testing the stimulus at 3561 unique phases was computationally taxing, and so the inventors examined 356 unique phases, spread out by 1-ms across one cycle of rotation around the ring.

Stimulus Search Algorithms

For each of the models described above, novel stimulus waveforms were generated and optimized using an extrema-featured stochastic hill-climbing approach, which the inventors call an "extrema distortion algorithm" (EDA) [35]. The algorithm iteratively distorts an original waveform shape generating a set of new waveforms, tests each for optimality, and then chooses the best waveform as the starting seed for the next iteration. Multiple, independent initial seeds enable the algorithm to search for both local and global optima. In order to address the question of finding stimulus waveforms that can open the phase window with energy optimal stimulus waveforms, the inventors also apply the algorithm by constructing a compound performance metric that simultaneously (1) minimized stimulus energy and (2) achieved the specified phase window. In order to guarantee convergence to stimuli that open the phase window, the algorithm was programed to penalize deviation from the phase window with a higher weight over the minimization of stimulus energy, measured as L2-norm of the amplitude. Once the desired phase window was achieved, any solution that did not achieve the desired outcome all phases was penalized heavily and novel waveforms were sought that reduced L2-norm. The energy optimizing search was continued for 1000 iterations. This entire process was executed ten times with different starting conditions in order to generate ten different solutions.

Two sets of searches were conducted, one set with no constraints on the stimulus waveform shape and the second set with a charge neutrality constraint to mimic current neuromodulation requirements. Charge-neutrality is a constraint that is relatively common in neuromodulation practice and research due to concerns that the residual charge left in the tissue can cause damage [36]. The charge-neutrality constraint was implemented by removing the average DC offset after each distortion, projecting the distorted stimulus waveform into a charge-neutral space.

In order to compare the results from arbitrarily shaped waveforms to those of traditional biphasic waveforms, the inventors conducted a grid search across a range of parameters defining both two and three rectangular pulse configurations. This computationally intensive process can yield globally optimal configurations under the severe constraint of biphasic waveforms. The inventors completed an exhaustive search for the bistable FitzHugh-Nagumo model. For the two-pulse search, the inventors assumed a 1-ms pulse width, and varied the amplitude of both pulses from −10 to 10 at 0.1 intervals. The inventors varied the gap between the at 0.1-ms intervals, keeping the gap within 1 cycle length (13.1-ms). For the three-pulse search, the inventors maintained the 1-ms pulse width assumption, and varied the amplitude of the pulses from −4 to 4 at 0.4 intervals. The inventors had to increase the resolution of the search space for computational purposes. The gaps were varied at 0.1-ms intervals, with the constraint that the sum of the gaps did not exceed 1 cycle length (13.1-ms). Parameters for the most energy efficient stimulus were stored for each proportion of phase window opening out of the 131 phases tested.

Furthermore, the inventors were interested in understanding how noise affected phase-agnostic stimulus. Recognizing that biological systems are often inherently stochastic, the inventors added a zero-mean Gaussian random process with varying magnitudes of standard deviation ($10^{-5}$ to $10^{-2}$) to the x1 state variable in the FitzHugh-Nagumo equations for study. The inventors ran ten trials at each standard deviation of noise and the percentage of phase window opening was tracked for each of the experiments.

Results

Complex Waveforms Suppress Oscillation Via a Gentle Corralling Mechanism

Figure 2:
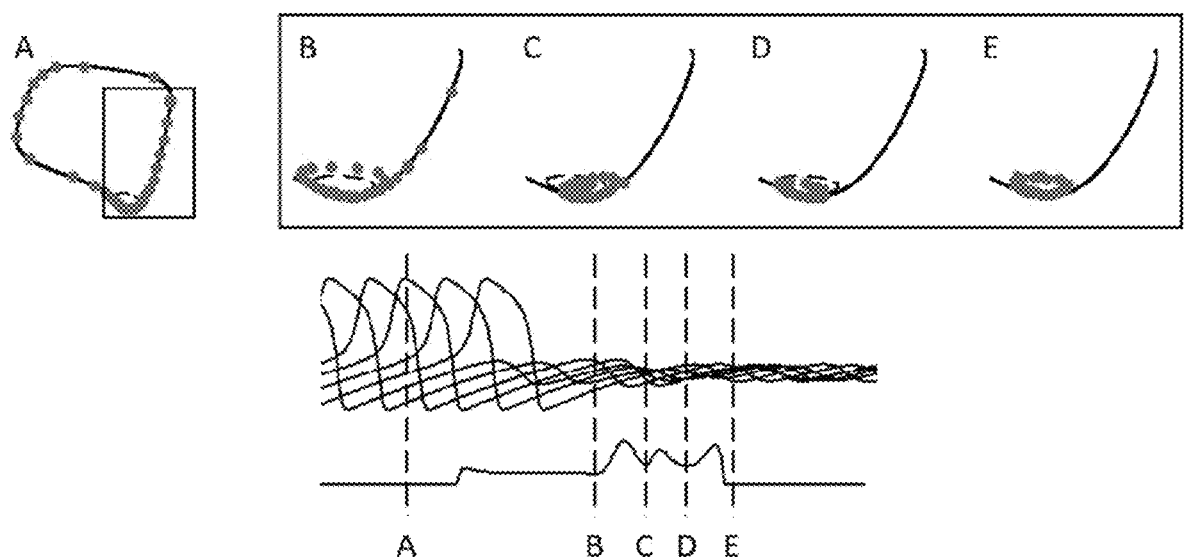
FIG. 2 illustrates the effect of the different portions of the phase-agnostic stimulus on the system from different start phases.

Using EDA, the inventors were able to discover a waveform capable of suppressing oscillations regardless of the phase at which the stimulus was given, as seen in FIG. 1. As a point of comparison, FIG. 1 also shows a stimulus whose waveform is optimized to suppress repetitive firing with the least amount of energy without the additional constraint of suppression when given at any phase. The inventors can see that, compared to the phase-specific stimulus, the optimal phase-agnostic stimulus is larger and more complex shape. When the inventors examine the optimal phase-agnostic stimulus waveform, the inventors note that there are roughly two components: a persistent hyperpolarizing current (positive stimulation) followed by a sinusoidal waveform with three peaks. It is important to note that the figures are aligned such that the stimulus is given at the same time, and the system has been initialized at different phases. FIG. 2 shows the effect of the different portions of the phase-agnostic stimulus on the system from different start phases. Each of the 131 dots in the figure represents a unique instance when the stimulus is being given at a different starting phase. At t=0, these dots are spread out evenly, by time, across the stable limit cycle in the FitzHugh-Nagumo model.

FIG. 1 illustrates optimal phase-agnostic stimulus (bottom left) is capable of suppressing oscillatory behavior (top left) when given at any phase compared to the optimal phase-specific stimulus (bottom right) which requires the stimulus be given at a specific time in order to suppress oscillatory behavior (top right). Note that the hyperpolarizing stimulus is depicted here as moving in a positive direction.

FIG. 2 illustrates an example of rhythm suppression of the FitzHugh-Nagumo model by a complex stimulus waveform initiated at different phases of the limit cycle. The stimulus was optimized by EDA. The clocks in state space are shown for specific time points (A, B, C, D, and E).

As can be seen, the persistent current portion of the stimulus lasts for approximately half of the stimulus length (B). The presence of the persistent current expands the basin of attraction to encompass the original limit cycle. If the persistent current remained for perpetuity, all the oscillators will suppress repetitive firing regardless of when the stimulus was given. However, because only a limited duration stimulus is being given, the second half of the stimulus is necessary. When examining the effect of each of the three sinusoidal pulses in the second half of the stimulus, the inventors can see that the stimulus is "rolling" up the dots into a tighter ball such that all of them lie within the original basin of attraction. Each sinusoidal pulse being given is large enough such that the instances which are soon to leave the basin of attraction are pushed back in, while small enough such that the instances that are within the basin do not get pushed out. The waveform shape is important for efficiently corralling all trajectories into the trapping region, irrespective of the phase of the limit cycle at which the stimulus was applied.

Figure 3:
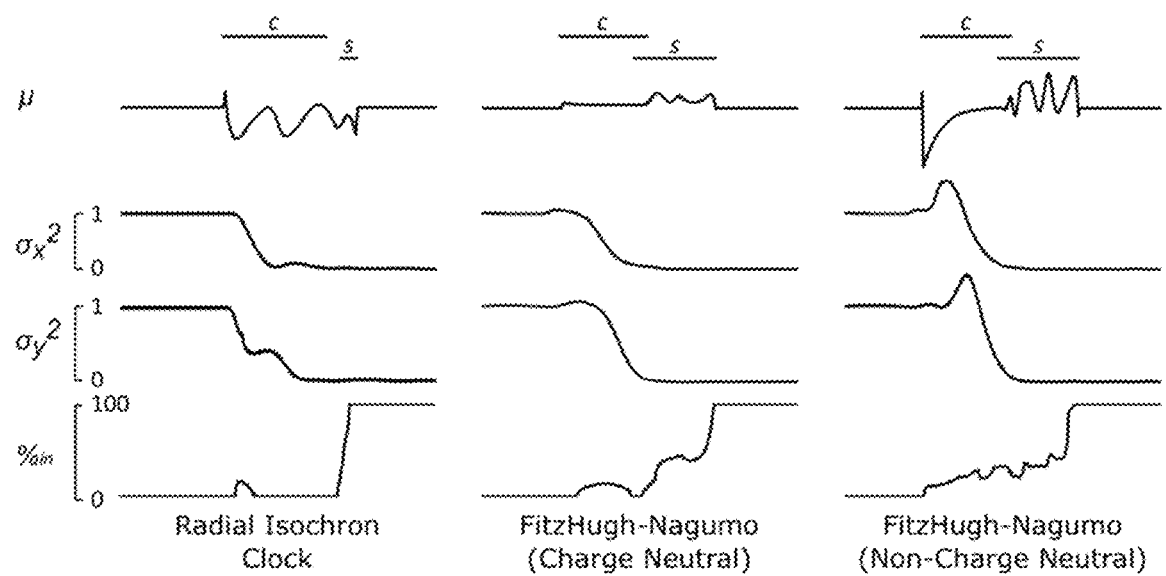
FIG. 3 illustrates the optimal stimulus to open the phase window in a radial isochron clock model had a clear corralling interval and a suppressing interval.

In a related article [30] from the inventors, it is shown that the optimal stimulus to open the phase window in the radial isochron clock model had a clear corralling interval and a suppressing interval as seen in FIG. 3. FIG. 3 also shows the optimal stimulus as seen in FIG. 2, but it is plotted using similar metrics of corralling (variation along the x- and y-axes) and suppressing (percent of oscillators within the basin of attraction of the fixed point) as the radial isochron clock from the previous paper. As can be seen from this figure, the optimal stimulus in the FitzHugh-Nagumo has overlapping corralling and suppressing intervals, in contrast the distinct separation of the two intervals in radial isochron clock model.

FIG. 3 illustrates the effect of the stimulus ($\mu$) shown on the variance in Cartesian coordinates of the clocks ($\sigma x2$ and $\sigma y2$), and the percent of oscillators that have been suppressed. The effect of the stimulus can be broken into two parts: the corralling interval (c) and the suppressing interval (s). Variance values are normalized such that the starting distribution has a variance of 1.

In the field of neuromodulation, charge neutrality is an important constraint to prevent tissue damage.

FIG. 3 also shows the results of the search process on the FitzHugh-Nagumo system where the stimulus is constrained to be charge-neutral. It is interesting to note that the second half of the stimulus looks like non-charge neutral stimulus in that the sinusoidal pulsing occurs again. The front half replaces the persistent current with a large negative pulse. When looking at the effects of the different portions of the stimulus, the inventors can see that this initial negative pulse corrals the phases similarly to the persistent current in the no-charge neutral stimulus. Regardless of what phase the stimulus is given, after the initial negative pulse, the spread of phases collapses into a smaller region. Like the non-charge neutral stimulus, once the phases collapse into a smaller region, the repetitive pulsing pushes the system into the basin of attraction around the stable fixed point.

Rectangular Waveform Suppress Oscillation Via a Rapid Corralling Mechanism

Figure 4:
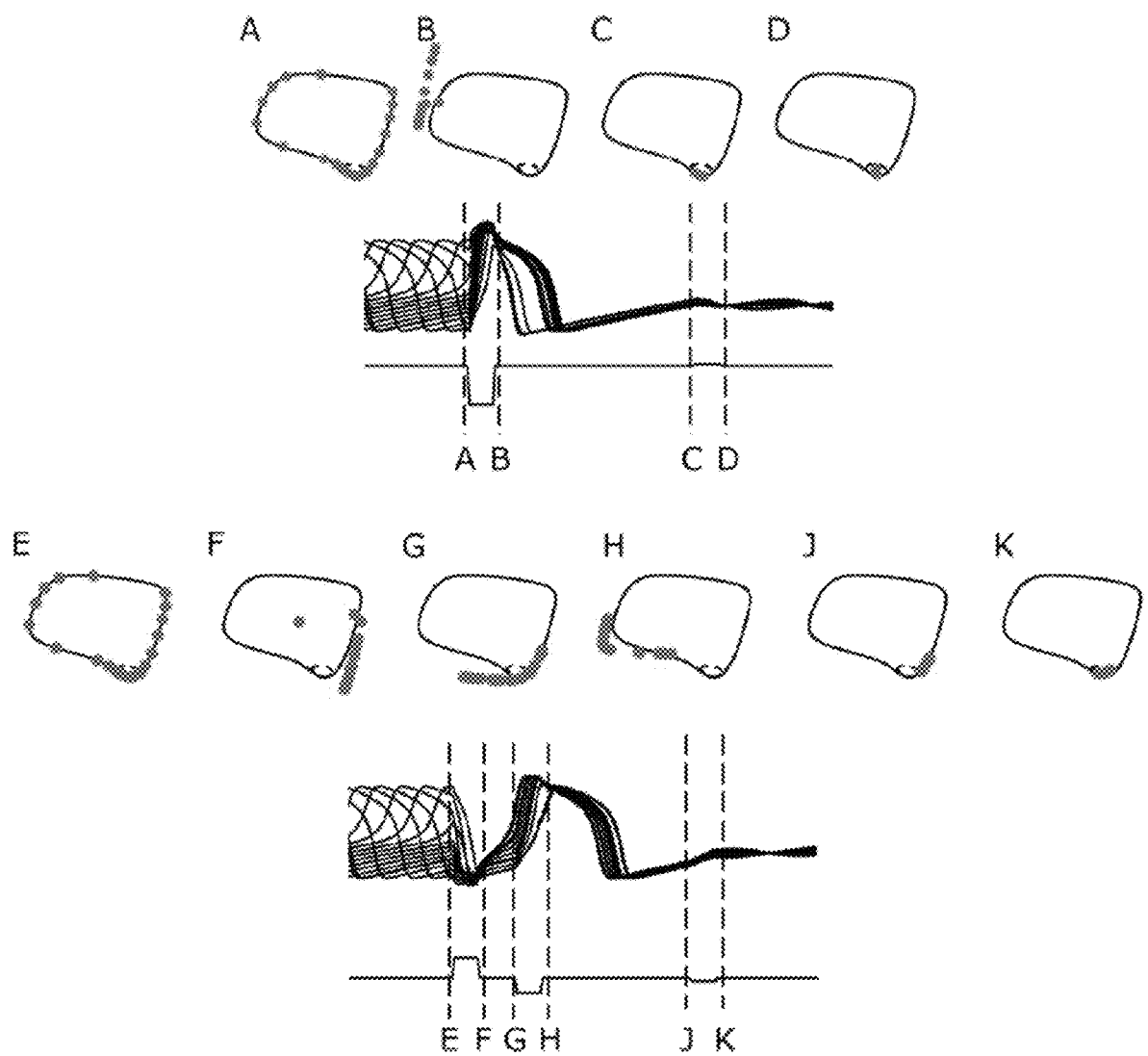
FIG. 4 illustrates the optimized two-pulse and three-pulse rectangular pulses waveform and its effect on the trajectories when initiated at different phases.

Current neuromodulation devices predominantly use rectangular biphasic waveforms. The systematic grid search of all biphasic rectangular waveforms reveals that phase-agnostic waveforms can be found in this search space as well. FIG. 4 shows the optimized two-pulse and three-pulse rectangular pulses waveform and its effect on the trajectories when initiated at different phases.

FIG. 4 illustrates two-pulse stimulation (top) requires more energy than three-pulse stimulation (bottom). In each section, phase amplitude resetting maps are shown above each of system's response and stimuli.

As seen in the two-pulse stimulus, the oscillators are all pushed far to the left of the FitzHugh-Nagumo stable limit cycle. This caused a phase reset to occur that shrunk the phase region, allowing the second pulse to quickly knock the oscillators into the basin of attraction of the fixed point. In the three-pulse stimulus, the first two pulses of the stimulus are used to corral the oscillators into a small phase region, allowing the third pulse to quickly knock the oscillators into the basin of attraction of the fixed point.

Figure 5:
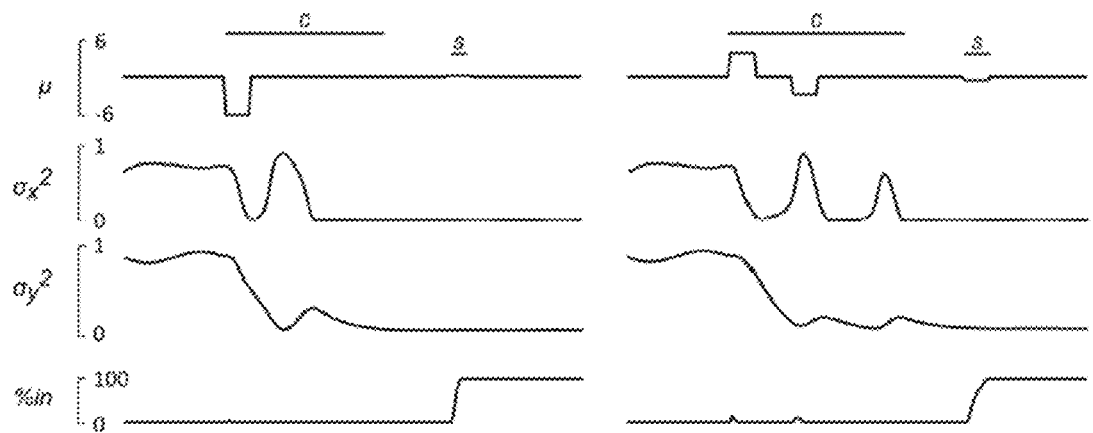
FIG. 5 illustrates the effect of both the two-pulse and three-pulse stimuli on the variances along both x- and y-axes as well as the percentage of the oscillators that have crossed into the basin of attraction.

Because two pulses are used to corral the phases in the three-pulse stimulus, the amount of energy required is much smaller (L2-norm of two-pulse is 28.13, L2-norm of three-pulse is 12). FIG. 5 shows the effect of both the two-pulse and three-pulse stimuli on the variances along both x- and y-axes as well as the percentage of the oscillators that have crossed into the basin of attraction. As can be seen, the optimized rectangular waveforms first corral the phases together and then induce a push across the unstable limit cycle into the basin of attraction.

FIG. 5 illustrates findings for optimal two-pulse and three-pulse stimuli (top) also demonstrate that the stimulus can be broken into distinct corralling phase (c) and a suppressing phase (s) as seen in the reduction of variances (second and third row), and the percentage of oscillators successfully suppressed (bottom). Variance values are normalized such that the starting distribution has a variance of 1.

Effect of Noise on the Phase Window

Figure 6:
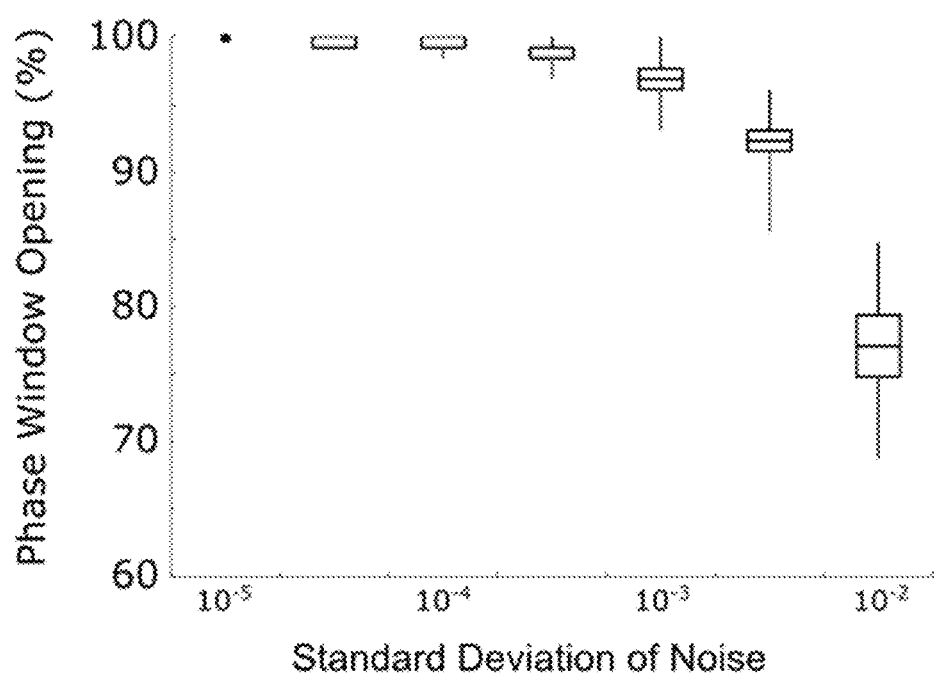
FIG. 6 illustrates that increasing noise in an oscillator's state variables diminishes the efficacy of the stimulus in terms of opening the phase window.

Does the opening of the phase window collapse with noise? In biology, the same stimulus given each time may potentially yield different results due to the inherent stochastic nature of the system. FIG. 6 demonstrates that increasing noise in the oscillator's state variables indeed diminishes the efficacy of the stimulus in terms of opening the phase window. Nevertheless, the complex waveform accesses the trapping region across a wide phase window, suggesting that the existence of an enlarged phase window is not limited to deterministic systems. It would be interesting to incorporate oscillator stochasticity in stimulus search to see if this yields optimal stimulus waveform solutions that are more robust to noise.

FIG. 6 illustrates the efficiency of the stimulus decreases as the amount of noise increases. Noise is added to the x1 state variable of the FitzHugh-Nagumo. The range and distribution of the phase window openings are plotted along the y-axis.

Opening the Phase Window in More Complex Models

Figure 7:
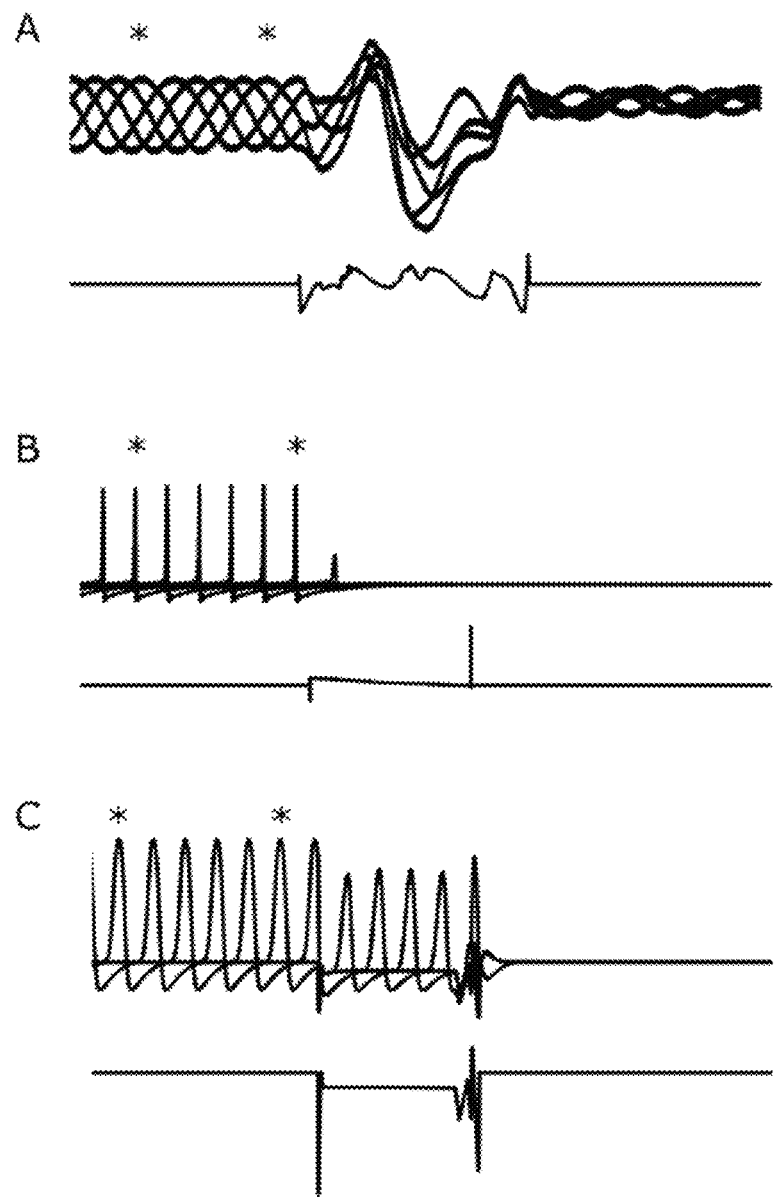
FIG. 7 illustrates optimal stimulus waveforms designed to open the phase window in various models.

The inventors next explored the possibility of opening the phase window for other more complex biological models, particularly those that are relevant to medical conditions. As can be seen in FIG. 7, the inventors are able to also open the phase window using the Suffczynski et al's population based model of epilepsy 37. Interestingly, however, the optimal waveform for the Epileptor model is just two pulses. The oscillatory and complex nature of the optimal waveforms seen in the FitzHugh-Nagumo and the Suffczynski et al model is absent in this model. This is explained by the fact that the Epileptor model has a planar separatrix between normal behavior and epileptic behavior 33. Unlike the other two models that have an unstable limit cycle nested within the stable limit cycle, characteristic of Andronov-Hopf oscillators [31], a stimulus in the Epileptor model just needs to cross a planar separatrix in order to transition from one state to the other.

Furthermore, the rapid oscillatory behavior seen in the EEG equivalent of the Epileptor model exists largely independent from the dimension that controls state transitions.

FIG. 7 illustrates optimal stimulus waveforms designed to open the phase window in the Suffczynski et al model (panel A), the Epileptor model (panel B) and the Glass-Josephson model (panel C). In each panel, the stimulus (bottom) is seen aligned to the system's response (top). The asterisks in each panel signify one cycle length.

In the cardiac model of reentrant tachycardia, there is a fundamental difference in that the action potential is traveling spatially and not just temporally as the inventors have been examining in the previous models. Even so, a non-rectangular waveform capable of suppressing the rotating wave from a single point source without knowledge of where the wave is spatially, as seen in FIG. 7.

Discussion

With recent interest in the use of electrical stimulation to correct aberrant oscillopathies, much of the focus has been on finding optimal, phase specific, stimuli. This study sought to challenge the assumption of phase specificity by examining the potential of phase-agnostic solutions. Using a bistable FitzHugh-Nagumo model, the inventors were able to gain insights into the mechanisms by which this can be achieved, and examine the use of an extrema feature stochastic search algorithm to finding optimal waveforms for other more complex systems as well. It is interesting to note that the waveform is generally complex, and that simple pulse solutions require much strong stimulation. When limited to two or three rectangular pulses, the inventors have noted that the stimulus can be broken into distinct corralling intervals and suppressing intervals. The beginning pulses are specifically corralling the different oscillators into one narrow phase range, and the last pulse then suppresses all the oscillators. However, with complex waveforms as found using EDA, the inventors note that these distinct intervals can overlap, with a portion of the stimulus achieving both corralling and suppressing simultaneously.

Furthermore, the inventors note that the complex waveforms kept the oscillators closer to the stable limit cycle. Whereas both the two-pulse and three-pulse rectangular shaped stimuli pushed the oscillators far away from the stable limit cycle to corral the phases, the complex waveforms generated by EDA kept the oscillators closer to the stable limit cycle, leveraging the dynamics of the limit cycle itself to help corral the oscillators together into a tighter phase window. By leveraging these natural dynamics, the complex waveforms was capable of utilizing much less energy.

The exception to this was seen in the Epileptor model, where two brief rectangular pulses suppressed oscillatory behavior irrespective of phase. On examination of the state space of the model, the inventors noted that its separatrix was parallel to the stable limit cycle as opposed to being nested within the stable limit cycle as is the case in the FitzHugh-Nagumo model. Because the separatrix is parallel to the stable limit cycle, the stimulus moving orthogonally is not impacted by the oscillatory nature of the system, and thus the timing of the stimulus is not critical. This finding is important as it indicates that phase-agnostic solutions could exist if the stimulus applied is occurring orthogonally to the stable limit cycle. However, the inventors note that there is clinical evidence that rectangular pulses applied to epileptic foci in humans is phase dependent [38].

The search for phase-agnostic stimuli has not been a major focus of current neuromodulation research. In fact, there is a growing recognition that phase specificity is a critical component to increasing the efficacy of stimulation under the current paradigm of rectangular biphasic waveforms [39]. The push towards closed-loop systems, in which the phase of the oscillations is captured and used to determine the timing of stimulus delivery, is an important direction. As the inventors have shown in this study, the energy necessary to successfully cause suppression at a restricted phase is much smaller than the energy necessary to successfully cause suppression at all phases. Yet, given the inherent noisiness of biological systems as well as the challenge to measure the instantaneous phase of the system, it may be difficult to deliver phase-specific stimuli. With the results of this study, a hybrid of the two concepts may be developed such that opening the phase window may help mitigate the challenges related to irregularities in the biological oscillations due to noise and phase tracking difficulties, allowing for increased efficacy. Furthermore, incorporating noise in the search algorithms may yield more efficient and effective stimulus waveforms. Future work may discover alternative complex waveforms that are optimized under noisy conditions.

Of note, the optimal phase-agnostic waveform is much more complex, with more peaks and valleys, compared to phase specific waveforms. While much of the literature in neuromodulatory control focuses on the use of rectangular pulses, developing more complex signals are not often considered. Most studies use a train of rectangular pulses where the shape and parameters for each pulse is the same. The parameters governing this search space are often limited to amplitude, duration, frequency and number of pulses. What this study shows is that each pulse may have unique characteristics around amplitude and duration, and that the gaps between pulses may be different. Furthermore, the fundamental shape of the pulse may hold large opportunities for energy optimization. These differences may be critical to opening the phase window, especially developing optimal phase agnostic solutions. Unfortunately, doing large grid searches across this space when the number of pulses is unknown, and each pulse having its own unique amplitude and duration, becomes nearly impossible as the search space grows exponentially with each parameter. As seen in this study, the use of an extrema feature stochastic search algorithm aids in navigating this search space with relative efficiency by reducing dimensionality of solutions through extrema pruning [35].

The inventors recognize that discretized phases are used and that this work was done using numerical approximations. The inventors currently do not have a closed form solution for phase-agnostic suppression of oscillatory behavior, and it is possible that under slightly different phase conditions the optimal stimulus found would not be successful. While it is possible to include more phases into the search process to increase the likelihood that the optimal solution works for every phase, that would come at a cost of computational time. The inventors' analysis using 131 phases discretized based on the resolution of the stimulus was a reasonable compromise. Further research may provide the mathematical framework for finding such optimal stimuli, as opposed to depending on the accuracy of numerical approximations from in silico experiments.

Hardware Description—pAWG

Introduction

Previously, the inventors developed an algorithm to identify an arbitrary waveform that induces some desired response from a black-box system while using the least amount of energy possible. This algorithm uses extrema distortion techniques to find this waveform without requiring knowledge of intricate details of a complex system [1], [2]. To further the development of the extrema distortion algorithm (EDA), hardware was developed to create a platform on which the EDA can interface with a myriad of black-box systems. With the EDA on a physical device, it can be deployed in experiments and studies to test and improve its performance in more specific applications rather than simulations.

Design

Figure 12:
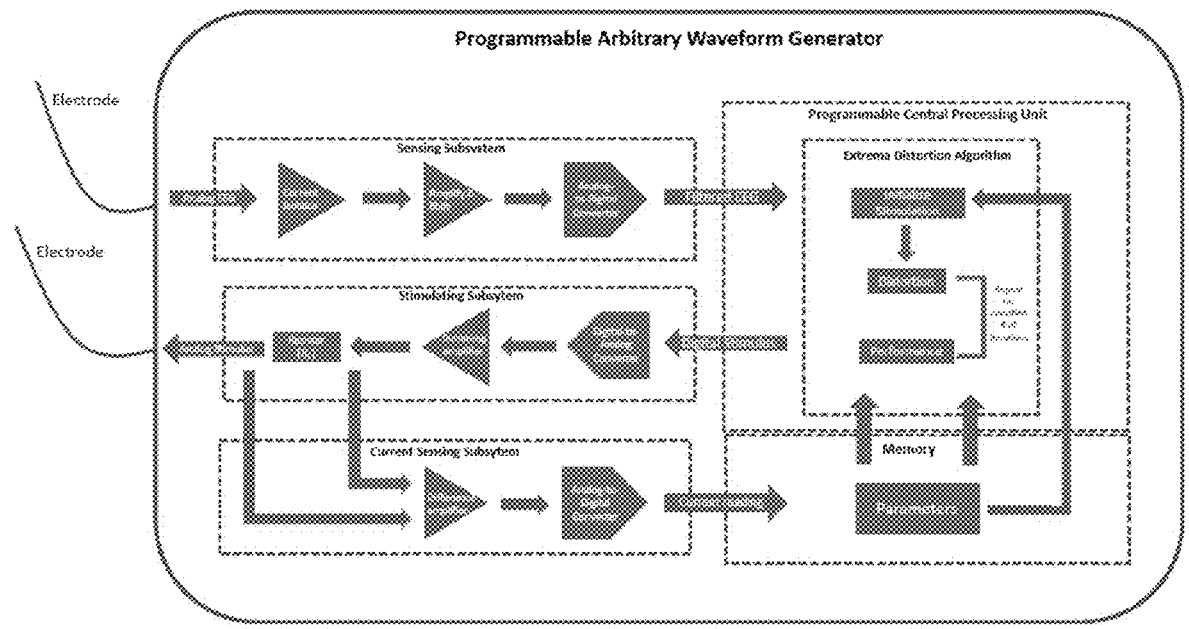
FIG. 12 illustrates a programmable arbitrary wave generator block diagram according to an exemplary embodiment of the present disclosure
Figure 13:
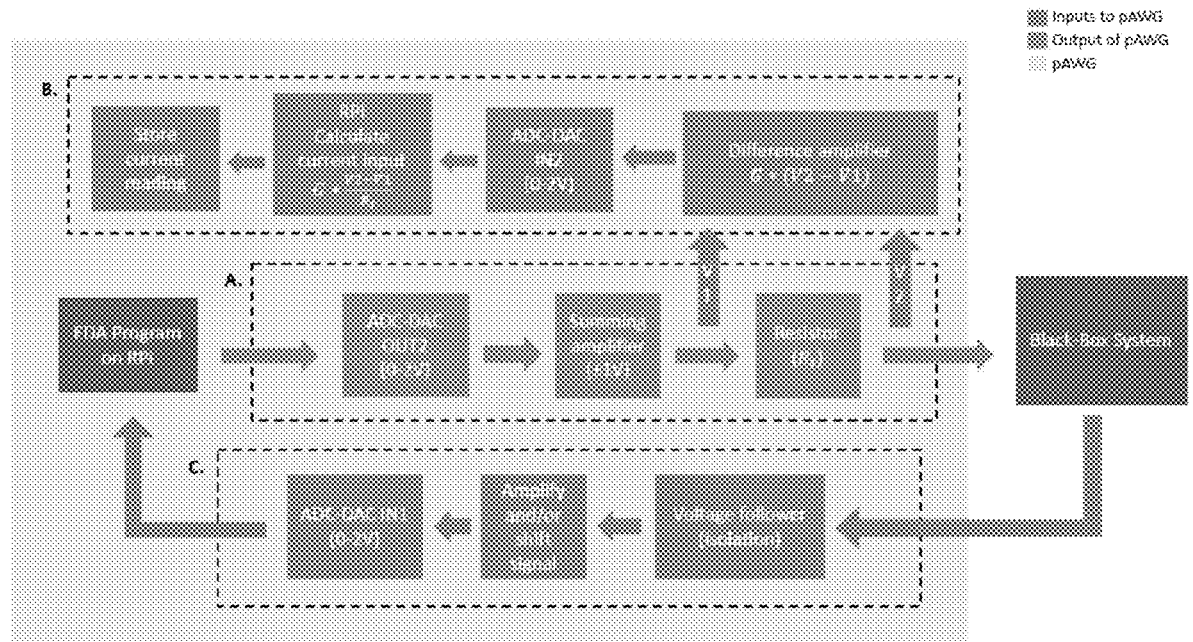
FIG. 13 illustrates a programmable arbitrary wave generator flow diagram according to an exemplary embodiment of the present disclosure.

The hardware developed by the inventors in conjunction with the EDA is termed the programmable arbitrary waveform generator (pAWG) and is capable of producing biphasic waveforms with amplitudes of ±1V and a resolution of 488 µV at a maximum frequency of 1 kHz. FIG. 12 illustrates a pAWG block diagram and the major components of the pAWG and their interactions. This pAWG can produce waveforms of any shape within the specified ranges. In contrast, many commercially available neurostimulators used to treat neurological conditions utilize only rectangular pulses [3]. The pAWG described here consists of a Raspberry Pi 3B+ microcontroller [4], one 12-bit analog-to-digital converter (ADC) and 12-bit digital-to-analog converter (DAC) hardware attached on top (HAT), and Analog Devices OP07CPZ operational amplifiers[5]. The EDA is stored on an SD card on the microcontroller and is executed using Python 3 (FIG. 12). The microcontroller has internet capabilities, allowing for remote access via secure shell (SSH) protocol. With the microcontroller's 1.4 GHz 64-bit quad-core processor, multiple processes can be performed simultaneously. These processes can be broken down into outputs and inputs of the EDA on the microcontroller as shown in FIG. 13. FIG. 13 illustrates a pAWG flow diagram. In panel A, the EDA-generated stimulus is converted to an analog signal by a 12-bit digital to analog converter (DAC). The stimulus is shifted down so its amplitude falls between +/−1V. The adjusted stimulus flows across a resistor to the target system. In panel B, the current being injected into the black-box system is measured and scaled to fall within the 0-2V constraint of the analog to digital converter (ADC). The analog current signal is stored for future use in the EDA. In panel C, the black-box system is isolated from the pAWG by using a voltage follower. The system response signal may then be shifted or amplified to fall within the ADC 0-2V constraint.

Output

Figure 14:
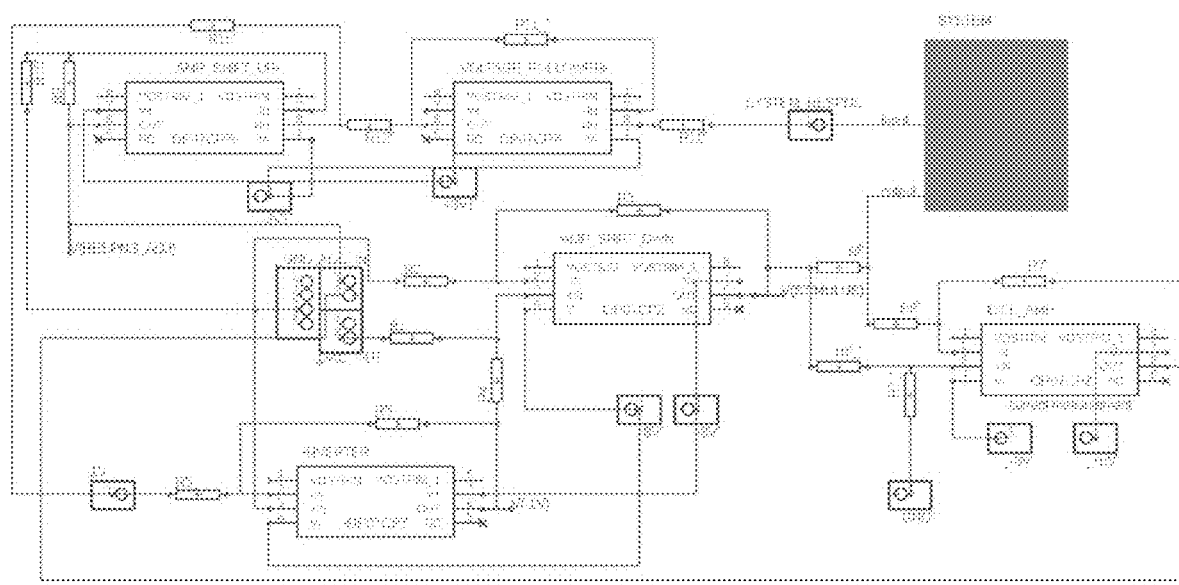
FIG. 14 illustrates a programmable arbitrary wave generator circuit diagram according to an exemplary embodiment of the present disclosure.

Once the EDA generates a stimulus, the microcontroller passes the stimulus to a DAC output channel on the ADC-DAC HAT at a rate of 1 kHz. The DAC converts each 12-bit digital value in the stimulus to an analog voltage value between 0V-2V. An operational amplifier configured as a summing amplifier shifts the voltage stimulus so that its amplitude is now between ±1V. Resistor values of the summing amplifier may be adjusted to additionally scale the stimulus, if necessary, depending upon the target system. The final, adjusted stimulus ($V_{stimulus\_adjusted}$) is defined in Equation (1) below, where $V_{stimulus}$ is the EDA-generated stimulus and resistors are those shown in FIG. 14, which illustrates the programmable AWG Circuit Diagram. In FIG. 14, the "input" and "output" labels refer to the input and output of the pAWG. The ADC_IN and DAC_OUT labels refer to the ADC-DAC HAT on the Raspberry Pi 3B+. The final stimulus then generates current as it flows across a resistor ($R_I$) to the system of interest.

$$V_{stimulus\_adjusted} = \left[1 + \frac{R_3}{R_2}\right]\left[\frac{V_{stimulus} - 1}{2}\right] \quad (1)$$

Inputs

The amplitude of the current associated with the voltage stimulus is measured and can be used as a performance metric in the EDA. As the stimulus is output from the DAC, the microcontroller simultaneously reads the current across $R_I$ between the DAC output and the system of interest. The current (I) is measured using an operational amplifier configured as a difference amplifier. The negative and positive inputs to the amplifier are connected on either side of $R_I$, and resistor values are chosen such that the signal is amplified by a factor, G, to be in range of the ADC input (0V-2V). The output of this difference amplifier ($V_{out}$) is connected to a channel of the ADC and is defined in Equation (2). The voltage difference across $R_I$ ($\Delta V$) is read at a sample rate of 1 kHz. The EDA calculates the current associated with the given stimulus using Ohm's Law, as defined in Equation (3). Resistor labels refer to those in FIG. 14.

$$V_{out} = \frac{R_7}{R_8}(\Delta V) = G * (\Delta V) \quad (2)$$

$$I = \frac{V_{out}}{R_I} \qquad (3)$$

At the same time, the system's response to the EDA stimulus is read by the microcontroller at a sampling rate of 1 kHz. The output voltage of the system ($V_{sys\_response}$) is first connected to an operational amplifier configured as a unity-gain amplifier to isolate the system of interest from the pAWG hardware. The output voltage from this amplifier must be in the ADC range of 0V to 2V, so another amplifier may be used to set a DC voltage offset (i.e. shift the voltage range) and scale the amplitude. The values of the DC offset and gain are dependent on the target system's output voltage range. The final voltage read from the system ($V_{sys\_response\_adj}$) is described by Equation (4). Resistor labels refer to those in FIG. 14.

$$V_{sys\_response\_adj} = \left[1 + \frac{R_9}{R_{10}}\right]\left[\frac{V_{sys\_response} + \text{DC\_Offset}}{2}\right] \qquad (4)$$

In summary, the pAWG described here can be used to interface with a variety of black-box systems. The pAWG provides a closed-looped system in which the analog response of a black-box system is recorded during stimulation and is used to inform the generation of a more optimal stimulus. Stimulation consists of a single-channel, biphasic waveform with an amplitude of ±1V and a resolution of 4880 µV at a maximum frequency of 1 kHz. The simultaneous recording of the black-box system response as well as the current output of the AWG during stimulation is a vital aspect of this device. These measurements can be used to optimize stimuli for a desired outcome while monitoring the amount of current injected into the system. In addition, the user can easily modify the software program simply by uploading the program to the SD card either remotely or directly.

The advantages of the pAWG are abundant. This device is designed to optimize waveforms to elicit a desired outcome in a system. This type of system has many applications, including deep brain stimulation (DBS). The black-box system in this case would represent a network of neurons in a section of brain tissue. The current-monitoring feature of the pAWG is important for use in human subjects because injecting too much current into biological tissue is known to cause harmful side effects in DBS [12]-[14].

The quad-core processor on the microcontroller gives the AWG the ability to read and write simultaneously, providing accurate response information from the black-box system. Using the EDA program stored on board the microcontroller, the pAWG can generate any type of waveform within the voltage range of the DAC with a high resolution. It is not limited to pulses or square waves that are common among AWGs [3]. Using the SSH capabilities of the microcontroller, the user can upload customized versions of the EDA and adjust parameters of the algorithm remotely. This allows for simple adjustments to be made while adapting the device to a specific black-box system, or patient in the case of DBS.

The limitations of the pAWG design include its power consumption and overall size. The Raspberry Pi microcontroller uses between 3-5 W of power and requires large batteries. To market the device for neurological applications, the AWG needs to be more compact. Furthermore, the device is limited to two channels on the ADC and DAC. Increasing the number of channels would allow for recording and stimulation at multiple electrode contacts along a lead.

Certain advantages of the pAWG presented here include its combination of several techniques and its application of the patented extrema distortion algorithm. This pAWG simultaneously records responses from the target system as it sends a stimulus, then uses this recorded feedback to adjust the stimulus. This process makes the pAWG a closed-loop system. In addition to recording the target system response, the pAWG records the current levels injected into the target system. The wireless SSH capabilities of the device allow for remote access without the need for any additional hardware interfaces, such as telemetry or USB connection. The combination of the closed-looped design, simultaneous current and response recording during stimulation, remote access, and the non-traditional, EDA-generated waveforms make this pAWG device unique.

There are currently two commercially available, DBS products capable of recording and stimulation: NeuroPace RNS [6] and Medtronic Percept PC [7]. The NeuroPace RNS does not simultaneously record and stimulate, and its stimuli can only contain two bursts [8]. However, this system is closed-looped as it uses its recordings to automatically determine when to send a stimulus [8]-[10]. To communicate with the implanted device, you must use a wand connected to a laptop or tablet [8]. The Medtronic Percept PC does simultaneously record and stimulate using a single lead [7], [10]. However, this device is not closed-looped because it does not use the recordings to adjust the stimuli. It simply stores the information for later viewing [7], [9], [11]. Neither of these devices explicitly state the use of current monitoring.

Future work consists of physically scaling down the pAWG device. The goal is to have all components on a small form chip that can easily be implanted in human subjects. One way to achieve this is to customize the microcontroller so that only necessary components are included in the pAWG. The Raspberry Pi has several ports that are not vital to the AWG and add to its footprint. Professionally manufactured circuit boards can help reduce the AWG's footprint. Removing unnecessary microcontroller components will also help reduce the power consumption of the microcontroller, requiring smaller power sources and further minimizing the overall footprint.

In addition, the pAWG should be evaluated in animal or tissue experiments in which a specific, measurable electro-neurological outcome is defined, and this device achieves that outcome using two electrodes: one for stimulation and one for recording. The results of such experiments could provide valuable information about the device performance, such as the accuracy of the response recording and the amount of energy, current, and stimuli required to achieve the outcome.

Lastly, directional deep brain stimulation (dDBS) has become an increasingly popular area of interest [15], [16]. This technology attempts to limit the amount of current sent to non-target areas of the brain while optimizing current stimulation to target areas to produce a desired outcome [17]. The leads used for dDBS have many contacts in which some or all the contacts are independent of each other [15], [18]. That is, a different voltage value can be sent to different contacts on the electrode, resulting in an asymmetrical stimulus focused on a specific area within the target system. Computational modeling studies have shown that directional leads are better at stimulating target areas and avoiding stimulation of non-target areas than typical cylindrical leads

[18]-[20]. Directional DBS is in its early stages and combining this technique with the device could be very innovative. The pAWG presented here can be adapted to such dDBS technology by adding more ADC and DAC channels to connect to several contacts on directional leads.

The EDA can be modified so that the position of each contact on the stimulating lead and the target area of the system are considered in the optimization algorithm. The current EDA represents the input to the biological system as a single vector. This vector would be insufficient to accurately represent the multiple waveforms necessary in directional DBS. The inventors propose that the existing methods would need to be restructured from a single vector to a matrix in order to accommodate this fundamental change in inputs. By reconstructing the input structure, the inventors will be able to not just optimize a single waveform, but a group of waveforms, tuning each one individually in order to maximize some performance metric.

Not only will the inventors need to change the input structure of EDA, but the inventors would also need to reconstruct the performance metric. Whereas traditional EDA examines a single output from the system, the inventors are proposing that when approaching directional DBS, multiple outputs will be necessary from the system. One of the main purposes of directional DBS is to improve specific targeting of electrical stimulation. The goal is to stimulate a specific region, while not stimulating, or at least minimizing stimulation, to surrounding regions. As such, the performance metric will require recording and analyzing outputs from multiple regions, maximizing stimulation in certain areas while minimizing energy everywhere else. Thus, the current form of EDA will not only need to expand its inputs structure to encompass optimizing stimulus waveforms for multiple leads, but also in its outputs structure to encompass biological recordings from multiple locations.

Furthermore, the previously mentioned dDBS models only used rectangular stimulation pulses [19], [20]. The EDA's ability to generate a unique, non-traditional waveform may improve upon dDBS performance. Since EDA waveform shapes are not restricted, perhaps the EDA waveforms can more efficiently generate electrical fields that are targeted to specific regions in a system and require less complex lead designs.

Overall, the pAWG provides the next step in creating a device that implements the novel EDA. Although this hardware is the first iteration of many to come, the pAWG presented here shows promise for many future applications.

Reinforcement Learning for Electroceuticals

Introduction

Electrical stimulation, or electroceuticals, has been used across a variety of different medical disciplines to induce biological state changes, often to revert pathological states back to normal healthy states (Chang and Paydarfar 2018). These devices have been used for a wide array of applications, like deep brain stimulation, spinal cord stimulation, cortical stimulation, neuroprosthetics, and much more. Neurologists use electrical currents in deep brain stimulators and vagus nerve stimulators to treat Parkinson tremors and epilepsy, while spinal cord stimulators have been shown to benefit patients suffering from chronic back pain (Jimenez et al. 2005; Dettling and Lisanby 2008; Lozano et al. 2008; Oakley and Prager 2002; Cameron 2004; van Maanen et al. 2009; Meregani et al. 2011; Bonaz and Bernstein 2013). In all of these applications, targeted electroceuticals are used to cause a state change from a pathological to healthy state.

One of the major challenges in the use of electroceutical therapy is determining the appropriate strength and shape of the stimulus. Current electrical stimulation systems allow for clinicians to control the strength and timing of stimuli but fix the shape of the pulses to be relatively simple, for example, rectangular or sinusoidal. Most current research in this field focuses on optimizing electroceuticals with respect to strength, timing, frequency, and duration of the stimulus (Kuncel and Grill 2004; Wilson and Moehlis 2016; Cassar et al. 2017). With new stimulators, stimuli can be completely customized in strength, timing, frequency, and duration, and in their fundamental shape, optimizing performance biologically and electrically.

In this paper, the inventors explore a closed-loop approach for electrical stimulation using reinforcement learning, a framework in which an agent explores an environment, achieves a reward, and decides actions upon that reward (Barto and Sutton 2017). The approach is believed to be novel in the degrees of freedom given to the reinforcement learning agent for electroceutical control. There have been previous works in using reinforcement learning for neuromodulation, but these works use reinforcement learning to optimize specific stimulus parameters, whereas in the new setup, there are no restrictions on the stimulus except a maximum duration and amplitude bounds (Kim and Shlizerman 2020). The inventors examine various state-of-the-art deep reinforcement learning algorithms and apply them to the Hodgkin-Huxley model, setting the goal for the agent to generate a low-energy stimulus that can trigger an action potential in the Hodgkin-Huxley neuron (Hodgkin and Huxley 1952). This idea of using multiple outcome metrics (triggering an action potential and keeping the stimulus low-energy) in a continuous space is also new in the reinforcement learning field. Finally, the inventors present their results and discuss future areas of interest with this work.

Reinforcement Learning Background

Figure 8:
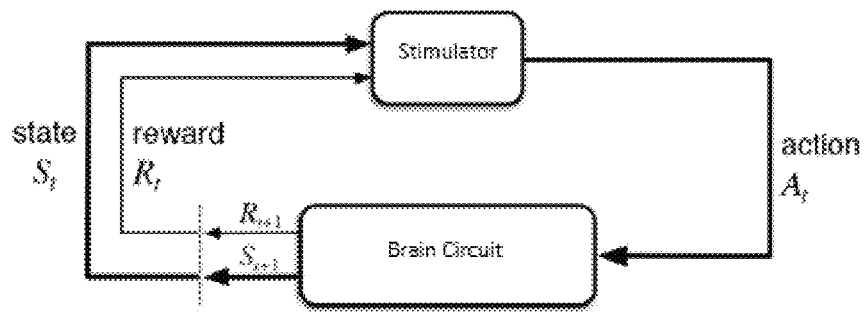
FIG. 8 illustrates a diagram of a reinforcement learning framework.

Referring now to FIG. 8, in an exemplary reinforcement learning framework, the stimulator functions as the agent and the brain circuit (in the inventors' experiments, the Hodgkin-Huxley neuron) is the environment, which is represented as a Markov decision process. The agent takes actions in the form of generating a stimulus, which is then applied to the Hodgkin-Huxley environment. Based on the response of the environment (how close did the stimulus get to generating an action potential, while also considering the energy of the stimulus), the environment returns a reward to the agent, as well as information about its new state as a result of the application of the stimulus. The agent then uses this reward and new state information to inform its next action. This training process continues until the agent can reliably trigger an action potential in the Hodgkin-Huxley neuron.

Embodiments of the reinforcement learning implementation disclosed herein provide advantages over existing techniques in at least two aspects. First, exemplary embodiments use reinforcement learning in neuromodulation and electroceutical control. There has been research in reinforcement learning around the idea of utilizing control on biological systems (Thomas et al. 2008; Zhang 2019), but this work has been mostly theoretical. Using reinforcement learning on a specific model of a neuron to trigger an action potential is an improvement over existing techniques, and the inventors envision that the framework developed and described in this paper could be used on other, more complex models, before transitioning to testing in a hardware setting, with electrical stimulators. The advantages of using reinforcement learning in a closed-loop electroceutical stimulation application, as opposed to other empirical search algorithms, are robustness to external noise in the system and being to personalize the agent for individual patients. Reinforcement learning tends to be more robust to noisy environments compared to closed-loop systems utilizing other algorithms, since the agent can learn to account for the noise in its actions as it continues to explore. Since reinforcement learning agents are constantly exploring their environments and learning from exploration, they can learn the structure of noise in an environment and adapt their actions to account for the noise. This is in contrast to current closed-loop stimulation systems, where the stimulus is fixed. In these cases, clinicians would have to tune the stimulus manually over time to account for any noise, which could be time-confusing and costly for a patient with serious conditions. Clinicians and researchers can "personalize" the reinforcement learning agent to account for characteristics seen in individual patients. The idea of personalization is possible in reinforcement learning because of the adaptability discussed earlier. Because of their ability to adapt to changing environments, reinforcement learning agents that are trained on a general model can easily be applied to specific cases after sufficient training. This is a major advantage over current systems, which are more rigid. Clinicians must personalize stimulation to patients by working with the patient and understanding the important characteristics that affect stimulus parameters. This personalized reinforcement learning agent could be implemented with a two part training process: (1) train agent initially on computational models to familiarize it with general system dynamics and (2) improve the agent performance on a specific patient based on personal characteristics related to the condition of that patient. This personalization ability is unique to a stimulation system that uses reinforcement learning, and therefore this approach would be very new in this field.

Another significant advantage of techniques disclosed herein is the use of multiple outcome metrics in a continuous observation space (Hodgkin-Huxley) reinforcement learning application. While the foundational concepts of reinforcement learning are well-known, the actual implementation of reinforcement learning differs from application to application. The problem of optimizing stimulation in electroceutical devices is challenging because of these two concepts: multiple outcome metrics and a continuous observation and action space. Unlike the more classic reinforcement learning examples in which there is a simple metric for reward, in electroceuticals, we are optimizing both energy efficiency as well as success of outcomes. This idea of multiple outcome metrics has been explored in theoretical research before, but the inventors have extended it by incorporating two different sources of reward into the reward function for the environment (Shelton 2001; Lizotte 2010). The stimulus generated by the reinforcement learning agent has to trigger an action potential in the Hodgkin-Huxley neuron while also keeping energy low, since high energy stimuli could cause negative side effects in patients. The inventors incorporated both of these goals into the reward function. After experimenting with various combinations of these goals (these experiments are fully explained later in the methods section), the inventors came up with this method: if the stimulus triggered an action potential, a reward of 100 was given. To account for the energy saving goal, the inventors subtracted each action squared multiplied by a scale factor (0.01) from the episode reward. This novel reward formulation forces the agent to consider both goals while training, so that the inventors can generate low-energy stimuli that accomplish the goal.

Reinforcement Learning Algorithms

The basic structure of a reinforcement learning framework involves the interaction of an agent with a specified environment. The agent repeatedly interacts with the environment with the goal of forming a policy (the most optimal actions) that maximizes reward returned by the environment. A simple example of where reinforcement learning can be used is to train an agent to play a board game, like chess. The action space in this example would be discrete, since there are a certain number of fixed actions a player can make on a given turn in a board game. The observation space would be the status of the board after a turn, so this could also be considered discrete, since there are a finite number of configurations that could be seen in the game. This problem of defining an agent for discrete action and observation spaces is well defined in reinforcement learning, and there are a number of algorithms that perform well in discrete settings, such as policy gradient algorithms, Q-Learning, and general actor-critic methods (Lapan 2018). The major difference in utilizing reinforcement learning for electroceuticals is that the action and observation spaces the inventors are working with are continuous. The action space, which represents the possible values of the stimulus, is continuous because it can hold any values from a range that the inventors specify. Similarly, the observation space is continuous, as the channels in a simple neuronal model can hold values from a certain range. Reinforcement learning for continuous action spaces is a more difficult problem, because of the complexity of continuous spaces in comparison to discrete spaces. Reinforcement learning algorithms for continuous spaces build on the concepts of the algorithms mentioned above, but often use neural networks to better model environment dynamics and to capture the complexities of continuous systems.

The inventors utilized two deep reinforcement learning algorithms for the closed-loop approach. The first method the inventors explored was Deep Deterministic Policy Gradients (DDPG) (Silver et al. 2014; Lillicrap et al. 2015; Lapan 2018). DDPG is a deterministic method that directly provides the agent with an action to take, given the current state of the environment. This algorithm is made up of two neural networks, an actor network and critic network. The actor network gives us the action to take for every given state. It takes the state as the input and returns a value for the action to take. This state-action mapping is deterministic, so the same network will always return the same action if the input state is the same. The critic estimates the Q-value, which is the discounted reward of the action taken in some state, using the state and action as inputs. This network is also deterministic, resulting in the same Q-value for each unique state and action pair input.

Native DDPG is well suited to environments with continuous action and observation spaces, but learning can be unstable, meaning that the reward over the course of the learning process varies considerably. To make the training process more stable, the inventors use an experience replay buffer which stores a history of (state, action, reward, next state) entries (Hessel et al. 2017). Updates to the policy of the agent are made on batches from the replay buffer, leading to more stable training, since the inventors update on information from many episodes of training instead of a single one. Another issue with training comes up due to the deterministic property of DDPG. This property means that for a given state, the action generated by the actor network will be constant. Early in the learning process, this could be disadvantageous, because the inventors want the agent to "explore" the environment by taking a variety of actions to get a full picture of successful and unsuccessful actions. To address this, the inventors can add an exploration component to the actor. The inventors use the Ornstein-Uhlenbeck (OU) process, which is a stochastic process that models the velocity of a Brownian particle under the influence of friction (Uhlenbeck and Ornstein 1930). In every episode, the inventors add the value from the OU process to the action returned by the actor. This introduces stochastic noise into the actions, which results in better exploration.

The second method the inventors utilized was Proximal Policy Optimization (PPO), which belongs to a class of reinforcement learning algorithms called trust region methods (Schulman et al. 2017). The overall goal of trust region methods is to improve the stability of policy updates during training. To adhere to this goal, trust region methods try to avoid making large updates to the policy. The main idea of PPO is to use a clipped objective to limit policy updates. To formulate this clipped objective, PPO uses the ratio between the new updated policy and the old policy scaled by a quantity known as the advantage. The advantage is a measure of how much a certain action is a good or bad decision given a certain state (what is the advantage of selecting a certain action from a certain state). The inventors can also optimize exploration in PPO using a similar technique as the inventors did in DDPG. The inventors sample Gaussian noise to perform time-correlated exploration, by adding this noise to the value of the actions generated by PPO.

Methods

The inventors set up the reinforcement learning framework using Python libraries. The agent networks were coded using the Pytorch libraries for deep learning. The inventors created the Hodgkin-Huxley environment using the OpenAI gym package in Python (Brockman et al. 2016). This package allows the user to specify environment dynamics and characteristics. With OpenAI gym, the user has to specify parameters of the action space, observation space, and the reward function. The action space parameters describe the bounds of values the stimulus can hold, as well as its length and resolution. The observation space parameters describe the bounds of values the response from Hodgkin-Huxley can hold, as well as how the agent will view the response. The inventors configured the reward to include two components: (1) how close the stimulus came to triggering an action potential in the voltage channel in the Hodgkin-Huxley system, and (2) energy of the stimulus (the L2-norm).

The inventors utilized three different environment configurations as described in the table below:

| | Action space | Observation space | Reward | Other notes |
|---|---|---|---|---|
| Environment 1 | [−5.0, 5.0], 300 points (resolution 0.1 ms-30 ms stimulus) | [−40.0, 100.0], 300 points (same as stimulus-30 ms) | If the resulting response contained an action potential (max value of any point >= 15), reward of 1 was given. Otherwise, reward was 0. (sparse reward) | Tweak: tried batches of 5 ms stimuli until the inventors got a 30 ms stimulus or the inventors triggered an action potential (agent would generate 50 points for an action) |
| Environment 2 | [−10.0, 10.0], 1 point (resolution 0.1 ms-30 ms stimulus) | [−40.0, 100.0], 10 points | If the episode triggered an action potential, a reward of 1000000 was given. For every action in the episode, the negative squared value of each action was added to the reward to influence the energy minimization objective. If there was no action potential triggered and the stimulus reached 30 ms (end of the episode), the max value of the response was added to the reward. | Main idea here was to give some time-contextual information to the agent in the observation. By making the observation an array of 10 points (the last 10 ms of the response), the inventors give the agent more context in how close it has come to triggering an action potential. |
| Environment 3 | [−3.0, 3.0], 1 point (resolution 0.1 ms-30 ms stimulus) | [−40.0, 100.0], 1 point | If the resulting response point >=15, terminate the episode, and give a reward of 100. Also incorporate energy into the reward: after each action, subtract the action squared * scale factor (0.01) from the reward value (the idea for this reward structure came from the MountainCarContinuous environment from OpenAI gym – reward is 100 for reaching the target of the hill on the right hand side, minus the squared sum of actions from start to goal) (Brockman et al. 2016). | In this approach, the agent generated the stimulus point-by-point. After a point was generated (action), it was appended to the stimulus array. The inventors then ran the new point through the Hodgkin-Huxley system using the Euler approximation method, and then appended the resulting response point to the response array. |

Results

Figure 9:
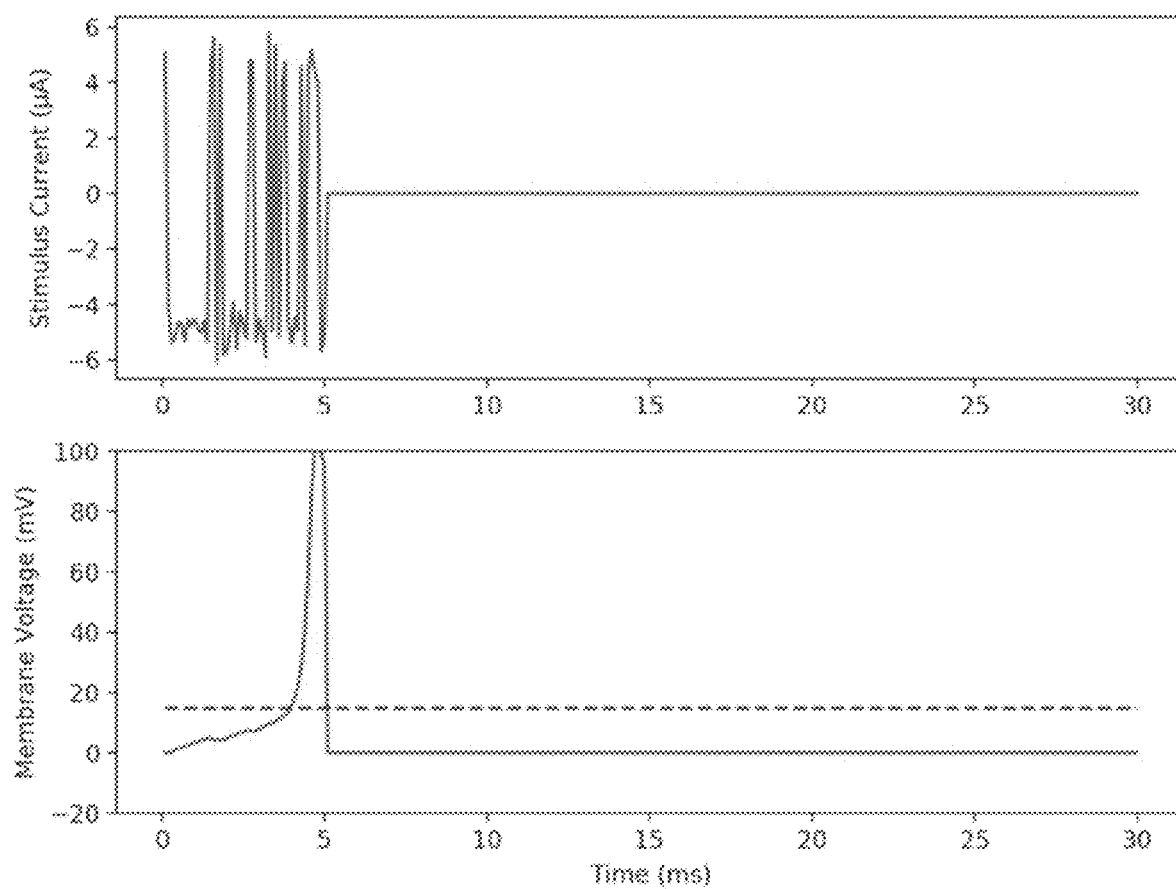
FIGS. 9-11 illustrate data obtained using the two reinforcement learning algorithms and the three environment configurations.
Figure 10:
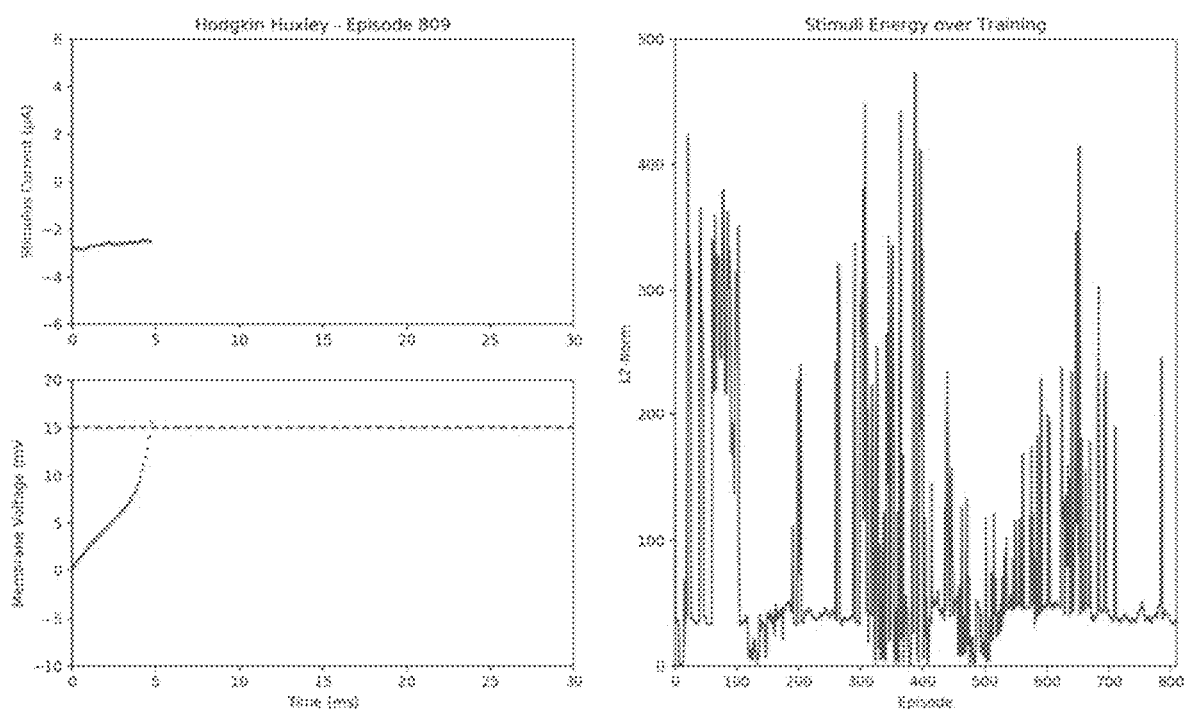
Figure 11:
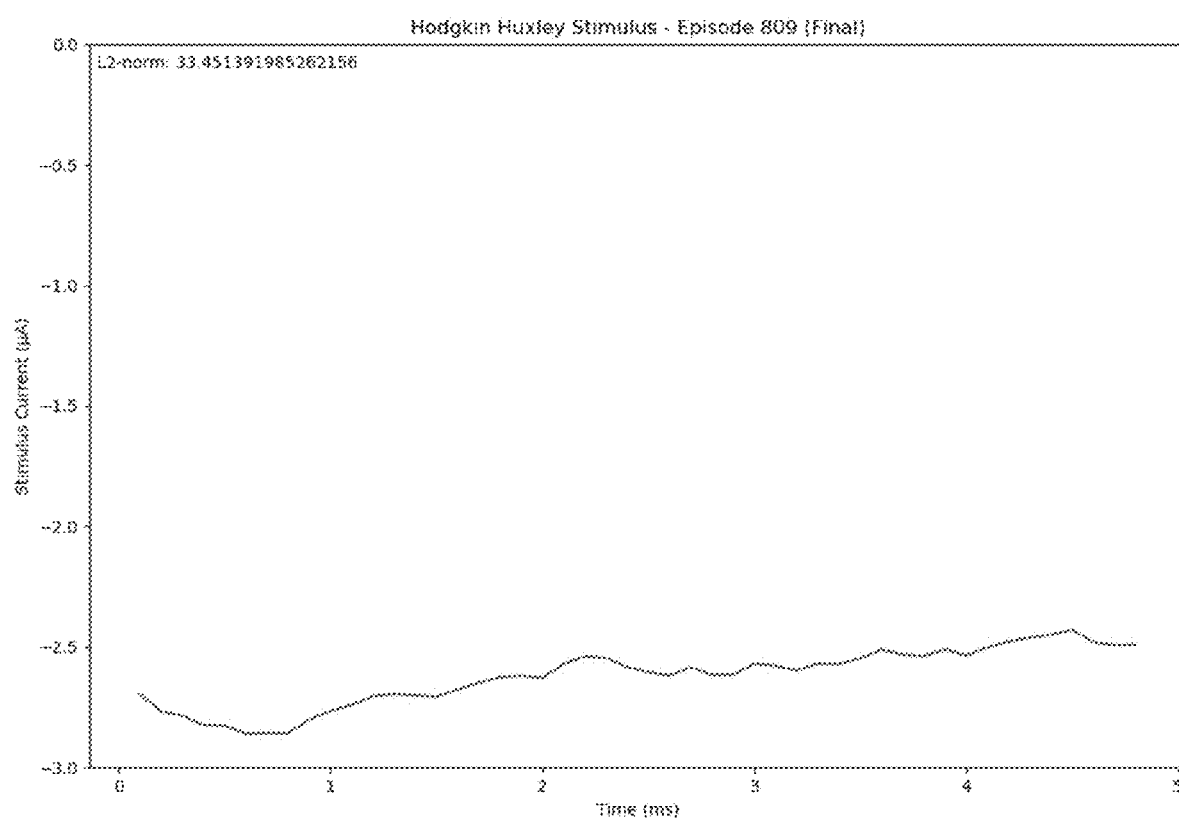

Referring now to FIGS. 9-11, using the two reinforcement learning algorithms and the three environment configurations described above, the inventors set up three different experiments to attempt to find successful, low-energy stimuli that were able to trigger an action potential in the voltage channel in the Hodgkin-Huxley model. FIG. 9 illustrates a successful stimulus for this approach, while FIG. 10 illustrates a final episode of training, showing the action potential and the L2-norm for all episodes of training and FIG. 11 illustrates a final stimulus for approach 3. The third configuration, using DDPG on environment 3, was the most successful and most realistic (in terms of implementation in hardware for electroceuticals) of all the experiments the inventors tried.

The first experiment was to use the DDPG algorithm on environment 1. Here, the agent generated the entire 30 millisecond stimulus as the action. The inventors attempted a variation of this method where the inventors had the agent generate 5 millisecond snippets that the inventors aggregated into a full stimulus, to see if shrinking the search space for each action could improve the performance of the agent. The inventors ran the stimulus through the environment and calculated a reward based on the following rule: if the voltage response contained an action potential, the reward was 1, and if not, the reward was 0. The observation in this setup was the full 30 millisecond (or in the variation the inventors tried: 5 millisecond) voltage response.

One drawback to this approach was that convergence was very difficult to attain, in part because the search space was so massive (the agent has to generate 300 points in each iteration of an episode). The inventors hypothesized that adding any sort of energy constraint to the reward function (in the form of a negative reward) would make the probability of convergence even lower. In addition, another issue here could have been the sparsity of the reward function. Because the reward was either 1 for success or 0 for failure, there was not any extra information contained in the reward to be learned. Even with the 5 millisecond action variation discussed earlier, convergence remained an issue.

The second approach the inventors used involved utilizing the PPO algorithm on environment 2. The inventors made modifications to the algorithm used and the environment to see if the inventors could get much better convergence with this setup. In this environment setting, the agent generated just a single point of the stimulus for each iteration of an episode. During an episode, each point generated was added to a stimulus vector, and then the stimulus was applied to the Hodgkin-Huxley system. Here, the observation consisted of 10 points, to give the agent more time-related information (the last 1 millisecond of the response, instead of the full response) instead of just a single point. The inventors configured the reward to be more gradual and less sparse than in environment 1. If an action potential was triggered in an episode, a reward of 1000000 was given. For every action in the episode, the negative squared value of that action was added to the reward for the episode, to account for minimizing the energy of the stimulus. An episode ended when an action potential was triggered or 300 points of the stimulus had been generated.

This approach did even worse in terms of convergence compared to the first approach. In most runs the inventors tried, it took at least 10000 episodes to trigger an action potential, and even later on in training, the agent was never able to consistently trigger action potentials, and never converged to any specific stimulus shape. The inventors hypothesize that this approach was unsuccessful because of the characteristics of PPO. PPO is an on-policy reinforcement learning algorithm, so it performs a policy gradient update after each episode, and then throws the data from that episode away (as opposed to storing it in a replay buffer, like DDPG). Since the algorithm starts off with taking more noisy, random actions, reaching the goal of triggering an action potential is rare. So when an action potential is finally triggered, it was unlikely that a single policy gradient update would be enough for PPO to start triggering action potentials consistently.

The third approach the inventors employed was to use DDPG on environment 3. Environment 3 was modeled on the OpenAI gym 'MountainCarContinuous' environment (Brockman et al. 2016). In this setup, the agent again generated the stimulus on a point-by-point basis. In the same way as the second approach, each action was added to a stimulus vector, and then the stimulus was applied to the Hodgkin-Huxley system. The observation was the response voltage at the current time; that is, the response voltage for the time the current stimulus point was generated. The reward function followed a similar structure to the reward in the second approach. If the resulting observation point indicated that an action potential was triggered (if it was greater than 15 mV), a reward of 100 was given. After each action, the inventors also added a negative reward component for the energy of the stimulus—the value of the action squared*a scale factor (0.01). An episode terminated when an action potential was triggered or when the stimulus was 30 milliseconds (300 points) long.

This was the most successful approach. By tuning the bounds of the action space and the scale factor for the negative energy component of the reward, the inventors were able to achieve convergence to the stimulus shown above after 809 iterations. Using the replay buffer in combination with DDPG was beneficial in leading to convergence. The L2-norm of the final stimulus was 32.72, so the inventors do have room to reduce the energy of the stimulus more to match the most optimal stimuli for the Hodgkin-Huxley system, seen in other methods like the extrema distortion analysis (EDA) (Chang and Paydarfar 2018).

Figure 21:
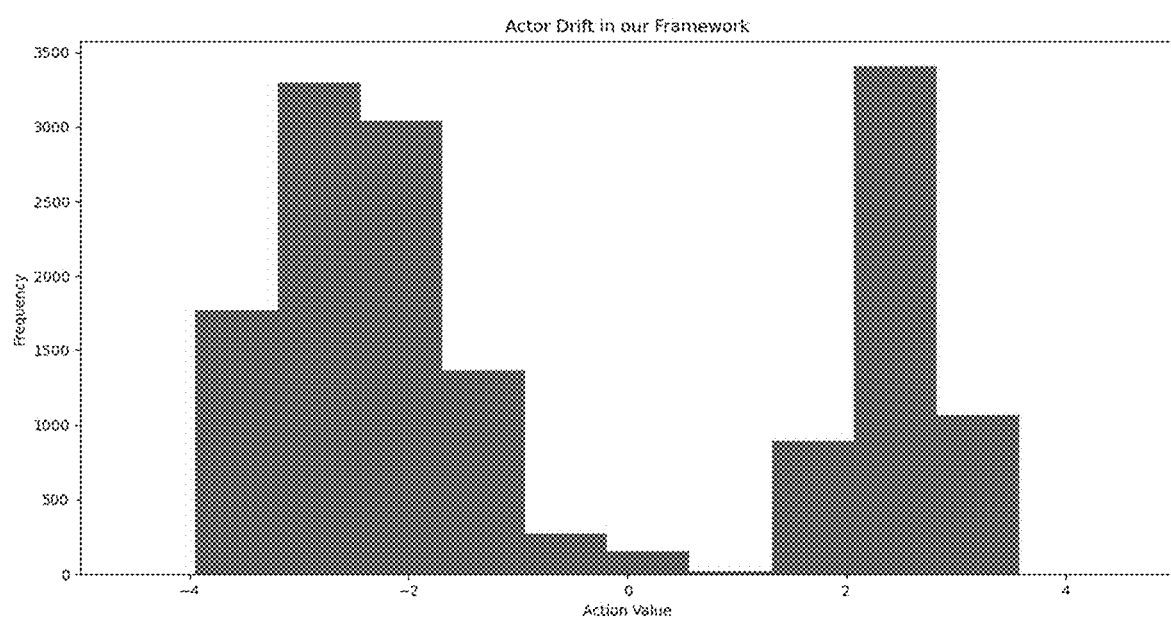
FIG. 21 illustrates a graph of frequency versus action value showing actor drift towards the bounds of the action space.

After achieving the results from the third approach, the inventors investigated reasons as to why the agent was converging to a solution that was higher energy than the solutions found by other methods such as EDA (Chang and Paydarfar 2018). The inventors hypothesized that one reason for the convergence to the suboptimal solution could be due to actor drift, a phenomenon described by Matheron et al. that is noted to occur in DDPG (2019). Actor drift occurs when the actor reaches a saturated state with respect to the provided action bounds very quickly. The authors show this phenomenon occurring in a simple toy environment with zero reward (2019). In a zero reward setup, the inventors would intuitively expect that the actor and critic remain constant since no reward is found; however, in Matheron et al.'s experiment, training the actor and critic resulted in non-zero updates which caused the actor to reach saturation (2019). The inventors investigated the prospect of actor drift occurring in the framework in normal reward and zero reward settings, and found that in both cases, the inventors saw strong evidence of actor drift. FIG. 21 shows the distribution of actions taken by the agent in a run in the regular reward setting in the first 100 episodes of training. This distribution clearly shows evidence of actor drift occurring, as almost all of the actions tend towards the limits of −3 or 3.

The inventors hypothesized that actor drift resulted because of the environment and reward function structure.

From Matheron et al.'s work, the inventors know that DDPG is prone to actor drift, so the inventors can expect to see some drift towards the bounds occurring naturally. In addition, in the inventors' framework, the actions that resulted due to actor drift obtained high reward for the agent. As seen from FIG. 10, a monophasic pulse around −3 triggered an action potential in the Hodgkin-Huxley neuron, which resulted in a large positive reward of 100. The inventors posited that the combination of the tendency of DDPG to naturally drift towards the action space bounds, and the fact that actions at the bounds of the action space in the environment resulted in high reward, led to very quick convergence to the monophasic solution shown in FIG. 11. An important point of note is that these monophasic stimuli are close to optimal if the stimulus length is restricted to 5 milliseconds. As seen in Chang and Paydarfar's work with the gradient algorithm, when the stimulus is restricted to be 5 milliseconds, the optimal stimulus is similar in shape to those found by the reinforcement learning agent (2014).

Figure 22:
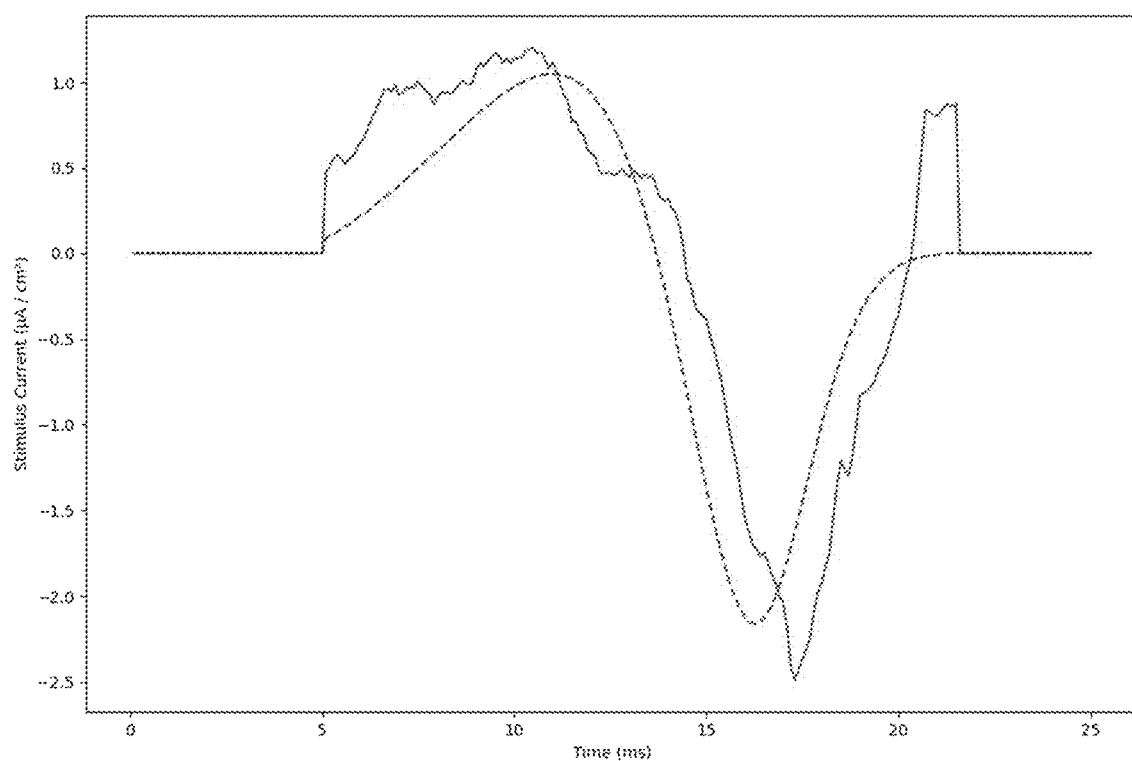
FIG. 22 illustrates a graph of stimulus current versus time showing a stimulus from a reward function after correcting for actor drift.

To combat this actor drift issue, the inventors made three changes to the reward function: (1) expanded the action space from −10 to 10, (2) set the scale factor for the negative reward to 0.15, and (3) changed the threshold for triggering an action potential from 15 mV to 100 mV. With these changes, the reinforcement learning agent took longer to train (trained for a full 10000 episodes with no cutoff point), but was able to generate biphasic, two-pulse stimuli with L2-norms between 19 and 27, a strong improvement on the previous approach. The best stimulus in training is shown in FIG. 22. This stimulus is successfully able to trigger an action potential and has an L2-norm of 19.08, much closer to that of the stimuli seen as the result of EDA (Chang and Paydarfar 2018). In comparison, the L2-norm of the best stimulus from the previous experiments was 32.72, so this new environment structure showed a significant improvement. The dotted line represents the best stimulus from Chang and Paydarfar's gradient algorithm (2014). This stimulus has an L2-norm of 15.39.

The changes the inventors made to the reward function worked better in finding a more optimal, biphasic solution. The inventors believe that expanding the action space from [−3, 3] to [−10, 10] and changing the negative reward penalty from 0.01 to 0.15 prevented the agent from converging to the actor drift solution. Since the bounds of the action space were much larger in this environment setup, the actor drift solution, while reliably triggering an action potential, had an enormous L2-norm, and this was amplified more by the higher negative reward penalty. In addition, since the action space was larger, the agent had more room to explore, and quickly learned that the actor drift solution was not optimal. The inventors think that this increased room for exploration led to the agent being able to find a more energy-efficient, biphasic solution. Finally, the inventors saw that increasing the threshold from 15 mV to 100 mV made a significant difference in the solutions discovered by the agent. The inventors experimented with different threshold values and found that as the inventors moved the threshold closer to the peak of an action potential in the Hodgkin-Huxley neuron, the agent was able to find solutions with lower L2-norms. The inventors saw similar results with the mountain car environment, where the inventors found 2-pulse solutions with the threshold set at the very top of the mountain, so the inventors suspect that the threshold setting plays a role in the agent finding the biphasic solutions.

Application to Other Neural Systems

A significant advantage of the reinforcement learning approach is that the framework the inventors developed for Hodgkin-Huxley can be used to generate stimuli for a variety of different neural systems. For any neural system in which the inventors want to use the reinforcement learning framework to generate stimulation, the inventors first must implement that neural system as an OpenAI Gym environment. This process includes implementing the system response equations in the environment, and designing a reward function that generates a reward for each action taken by the agent (Brockman et al. 2016). If stimulus energy is a component that needs to be optimized, the inventors can include a negative reward component in the reward function that corresponds to stimulus energy. Even with more complex neural systems, the reinforcement learning agent should be able to find optimal stimuli with a properly formulated reward function and with few changes to the agent itself.

Furthermore, when encountering the problem of the agent generating sub-optimal stimuli, the solutions that the inventors found in their approach for Hodgkin-Huxley could generalize well. When encountering these sub-optimal stimuli, the inventors could first check if the actor drift phenomenon identified by Matheron et al. is occurring (2019). If there is evidence of the actions drifting towards the bounds of the action space (even in a zero-reward setting), the changes the inventors made to the environment could serve as general solutions to find optimal stimuli. To allow for the agent to explore more for a more optimal solution, expand the action space. In tandem, to push the solution away from the actor drift solution, increase the negative reward weight corresponding to the energy of the generated stimulus. These possible solutions to the actor drift problem could generalize for other neural systems as well as other applications of reinforcement learning.

In summary, the inventors were able to design a reinforcement learning agent using the DDPG algorithm that converged to a specific, low-energy stimuli to trigger an action potential in the Hodgkin-Huxley voltage channel. The approach is unique in using reinforcement learning in neuromodulation and electroceutical control, and in using multiple outcome metrics in a continuous space, for a specific application of triggering an action potential in Hodgkin-Huxley. The inventors can improve on their current solution by finding ways to reduce the energy of the stimulus, to match optimal solutions from other studies.

In exemplary embodiments, the agent only sees the voltage values from the Hodgkin-Huxley system as observations, but the system includes more information from the other channels, like sodium and potassium levels. One direction the inventors could take is to treat Hodgkin-Huxley as a partially observable Markov decision process (POMDP), where the only "observable" channel the agent has access to is the voltage channel. If the inventors can use reinforcement learning techniques with POMDPs, like using an RNN layer or using hierarchical reinforcement learning, the inventors could potentially better model the entire Hodgkin-Huxley system in the agent, leading to more optimal solutions (Heess et al. 2015; Hausknecht and Stone 2017; Tuyen et al. 2018).

Another area the inventors can explore is utilizing concepts from control theory to improve the performance of the reinforcement learning agent. Optimal control can be described as operating a dynamic system at minimum cost. Since the system (Hodgkin-Huxley) can be described by a set of differential equations, and the inventors can apply a cost function on triggering and action potential as well as lowering the energy of the stimulus, a control theory framework combined with neural networks could be well suited for this problem and give us a more analytical way to find a robust, optimal stimulus for Hodgkin-Huxley and other models.

Isochron Clock Model

Nearly a half-century of biomedical research has revealed methods and mechanisms by which an oscillator with bistable limit cycle kinetics can be stopped using critical stimuli applied at a specific phase. Is it possible to construct a stimulus that stops oscillation regardless of the phase at which the stimulus is applied? Using a radial isochron clock model, the inventors demonstrate the existence of such stimulus waveforms, which can take on highly complex shapes but with a surprisingly simple mechanism of rhythm suppression. The perturbation, initiated at any phase of the limit cycle, first corrals the oscillator to a narrow range of new phases, then drives the oscillator to its phase singularity. The inventors further constructed a library of waveforms having different durations, each achieving phase-agnostic suppression of rhythm but with varying rates of phase-corralling prior to amplitude suppression. The optimal stimulus energy to achieve phase-agnostic suppression of rhythm is dependent on the rate of phase-corralling and the configuration of the phaseless set. The inventors speculate that these results are generic and suggest the existence of stimulus waveforms that can stop the rhythm of more complex oscillators irrespective of applied phase.

Regular clocklike rhythms are commonly observed in biology and medicine. In many cases, the oscillations can be halted if perturbed at a specific time with just the right strength. This phenomenon is known to be phase-specific, i.e., dependent on the timing of the stimulus within the cycle. In this study, the inventors discover ways to stop a simple clock irrespective of stimulus timing. The inventors explore features of the stimulus waveform that switch off the oscillation at any phase of initial impact, by first corralling the oscillator to a narrow range of new phases and then by perturbing the oscillator to its phase singularity. This mechanism appears to be generic and suggests the existence of stimulus waveforms that can stop the rhythm of more complex oscillators irrespective of applied phase.

Oscillatory behaviors and generators can be seen across all biology, from the cyclical patterns seen in certain molecular pathways and transcriptional feedback loops to the rhythms of pacemakers in the brain and the heart. Over the past few decades, a great deal of work has been done to study the effect of stimulation on these oscillators, quantifying and modeling the dynamics and mechanisms involved[1,2]. One particularly interesting finding is that a brief shock with a specific strength (within a narrow range) and given at a specific time (within a narrow window of phases) is capable of suppressing oscillatory behavior[1,3]. Most of this work used simple rectangular pulses as the stimulus.

A number of recent studies have explored and demonstrated the use of complex waveforms in order to achieve oscillatory suppression with much less energy[4,5]. Given that non-traditional waveforms have been shown to be more energetically efficient[6,7], the question arises regarding whether or not the use of non-traditional waveforms may also open the window of successful phases such that the stimulus generated could be given at any arbitrary phase and still successfully suppress the oscillatory behavior.

The inventors define a stimulus waveform as phase-agnostic if it drives the oscillator to its phaseless set regardless of the phase at which the stimulus is applied. In order to explore this concept, the inventors analyzed a simple model of the radial isochron clock. This model has been modified to accommodate a bistable system and a stimulus along the y-axis:

$$\frac{dr}{dt} = \varepsilon u(t)\sin(\theta) + r*(1-r)(r-a) \quad (1)$$

$$\frac{d\theta}{dt} = 1 + \frac{\varepsilon u(t)\cos(\theta)}{r} \quad (2)$$

where the parameter a defines the radius of the unstable limit cycle, specifying the boundary of the phaseless set for the stable attracting cycle at r=1, and u(t) is the stimulus[8]. The unstable limit cycle was set at a=0.25 unless otherwise specified, while ε=5.

Figure 15:
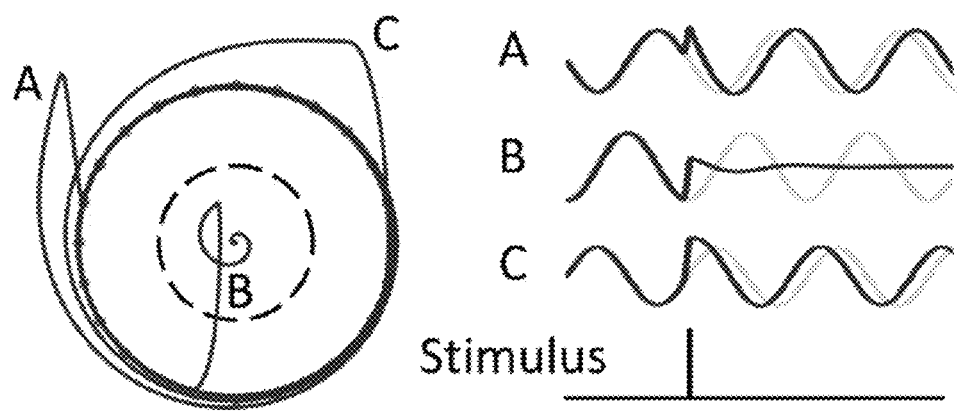
FIG. 15 illustrates a phase-specific stimulus pulse that stops a radial isochron clock.

It is important to note that in the figures, the inventors are superimposing the trajectories of independent and uncoupled radial isochron clocks onto one image for visualization purposes. Each clock is starting from a unique phase in order to demonstrate the effect of a single stimulus on different phases. In FIG. 15, a single rectangular stimulus is applied along the y-axis, with positive stimulation pushing the system "up". the inventors can see the effect of the same stimulus on the radial isochron clock at different phases of the stable limit cycle. When the stimulus, a positive rectangular pulse, is applied at the bottom of the stable limit cycle, as seen with trajectory B, the clock crosses the unstable limit cycle into the attraction basin of the stable fixed point at the center of the system. When the stimulus is applied at other phases, as seen with trajectories A and C, the clocks do not cross the unstable limit cycle, and thus returns to the stable limit cycle.

FIG. 15 provides an illustration of a phase-specific stimulus pulse that stops the radial isochron clock. A stimulus (bottom) is administered at three different phases of the cycle (A-C). A and C: the stimulus perturbs the system, which returns to its stable limit cycle oscillation (solid circle) B: the stimulus drives the system across the unstable limit cycle (dashed circle) to the stable fixed point. The trajectories are plotted both in state space (left) as well as in time (right). A control trajectory, where no stimulus is introduced, is also plotted (light grey) for reference in the time plots.

The aim of this study is to find an optimal stimulus waveform, u(t), which can cause every clock to transition from the stable limit cycle across the unstable limit cycle towards the stable fixed point. Due to the difficulties in finding an analytical solution using variational calculus, the inventors have chosen to use an extrema-featured stochastic hill-climbing approach developed previously[7], which the inventors call an "extrema distortion algorithm" (EDA).

EDA treats the system as a black box, and it leverages stochastic search techniques, specifically a hill-climbing approach, to iteratively find better solutions. This approach works by taking a randomly generated starting waveform and iteratively distorting the waveform by adding noise to both the amplitude of the extrema points (local minimum and maximum amplitudes) as well as the intervals between them. After the distortion, each new waveform is applied to the system and evaluated for both its ability to cause the desired outcome (e.g. suppression of oscillation) as well as its energy requirements, which in the case was computed using the $L^2$-norm of the stimulus. This process is conducted a number of times using the same starting seed, and the best waveform is then used as for the next iteration. the inventors demonstrated that this technique matched closely with results obtained using gradient-based techniques applied to the FitzHugh-Nagumo and Hodgkin-Huxley models[7].

The inventors initially restricted the duration of the stimulus to one cycle length of the radial isochron clock. In order to determine whether or not the stimulus duration affected the success of the stimulus in both energy consumption as well as in success of opening the phase window, the inventors also ran the same experiment for stimulus waveforms with a 0.5-cycle length, 0.75-cycle length and 2-cycle length durations. Furthermore, the inventors analyzed the effect of the size of the unstable limit cycle on both the success rates of opening the phase window as well as the energy requirements necessary for complete opening. the inventors also varied the radius of unstable limit cycle a, between 0 and 1, running 10 iterations of EDA for each experimental setup.

As a point of comparison, the inventors constructed grid searches to determine if rectangular pulses alone could fully open the phase window. Setting the unstable limit cycle at a=0.25, the inventors found the optimal parameter set for both two-pulse and three-pulse stimuli. In both of the searches, the amplitudes of the pulses were varied from −10 to 10, tested at 0.1 increments, and the gap between the pulses were varied at 0.1 time unit (equivalent to 0.016 cycle lengths) increments as well. the inventors maintained a 0.1 time unit duration for each pulse to constrain the search space. The maximum duration between and including the two or three pulse trains was limited to one cycle length. The Texas Advanced Computing Center at The University of Texas at Austin was used to run these grid searches in parallel using the Launcher codebase.

Results

Finding Phase-Agnostic Stimulus Waveforms

Figure 16:
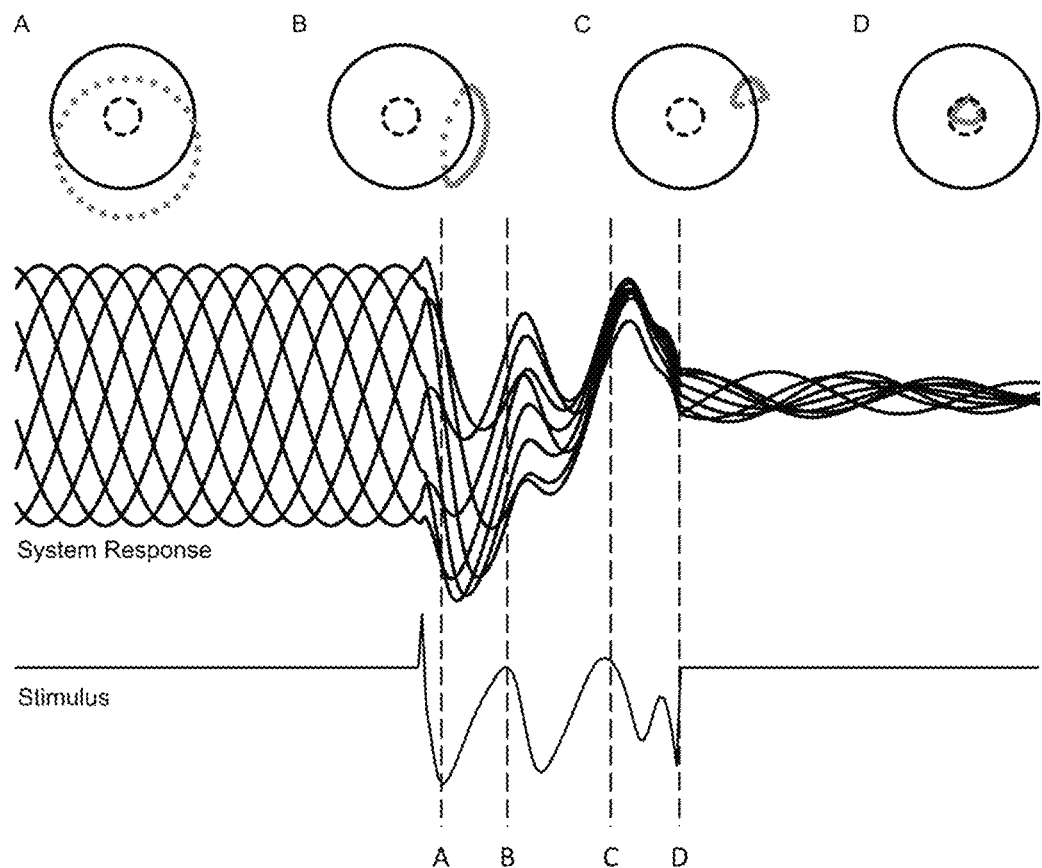
FIG. 16 illustrates an example of rhythm suppression by a complex stimulus waveform initiated at different phases of the limit cycle.

FIG. 16 is an example of a complex waveform that suppresses the radial isochron clock irrespective of the phase of stimulation. As noted previously, the inventors are applying the stimulus to 32 distinct, independent, and identical clocks, each starting at a different phase on the attracting limit cycle, and in each instance, the oscillatory behavior is suppressed. Here, the trajectories and locations of the clocks in state space and time have been superimposed for visualization purposes.

FIG. 16 is an example of rhythm suppression by a complex stimulus waveform initiated at different phases of the limit cycle. The stimulus was optimized for energy efficiency using EDA. The clocks in state space (top) are depicted for specific time points (A, B, C, and D) as marked in both the system response (middle) as well as the stimulus (bottom) time plots.

Through this visualization, the inventors are able to see that the initial pulse displaces all the clocks past the unstable limit cycle, which by itself would cause strong type 0 resetting, by pushing the clocks towards the bottom of the stable limit cycle. As the first pulse ends, the natural rotation and attraction of the points towards the stable limit cycle displaces the clocks into a narrower phase range. The second pulse is timed for when the variance between the clocks is largest parallel to the y-axis, causing maximal reduction in variance by the time the pulse finishes. Before the stimulus begins, the clocks are all spread out around the stable limit cycle. By the time the first two pulses are completed, the clocks are tightly packed in a much narrower phase region of the stable limit cycle. The first two pulse therefore exert a corralling effect on the clocks' phases, enabling the third pulse to displace all the clocks across the unstable limit cycle into the attraction basin of the stable fixed point.

Figure 17:
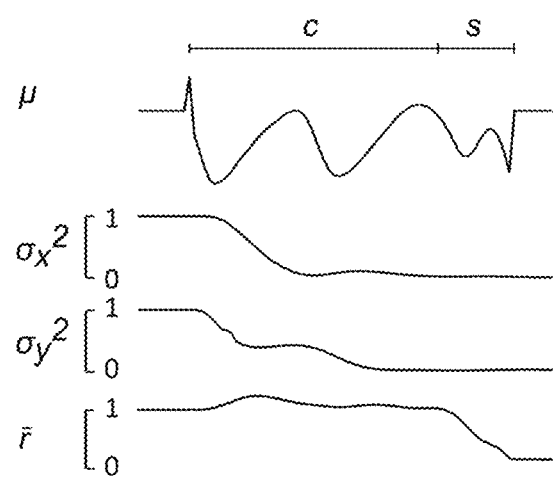
FIG. 17 illustrates the effect of a stimulus (μ) shown on the variance in Cartesian coordinates of clocks and the mean radius when examining polar coordinates (r̄).

FIG. 17 plots the data from a different perspective by examining the variances of the clock locations along both the x- and y-axis, as well as the mean of the radial coordinate. Here, the inventors can see more clearly that the first two pulses cause a collapse of the variances in x and y, concurrent with the corralling of every clock phase into a smaller region in the state space. The third pulse then causes the fall in mean radial coordinate, knocking the clocks across the unstable limit cycle and into the attraction basin of the stable fixed point.

FIG. 17 shows the effect of the stimulus (μ) shown on the variance in Cartesian coordinates of the clocks ($\sigma_x^2$ and $\sigma_y^2$), and the mean radius when examining polar coordinates ($\bar{r}$). The effect of the stimulus can be broken into two parts: the corralling interval (c) and the suppressing interval (s).

Figure 18:
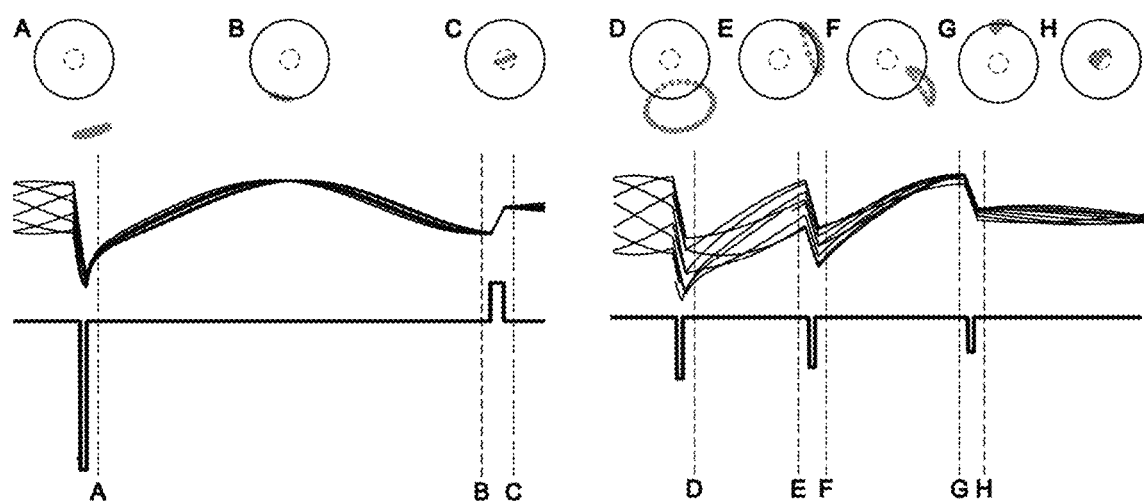
FIG. 18 illustrates two-pulse stimulation (left) requires more energy than three-pulse stimulation (right).
Figure 19:
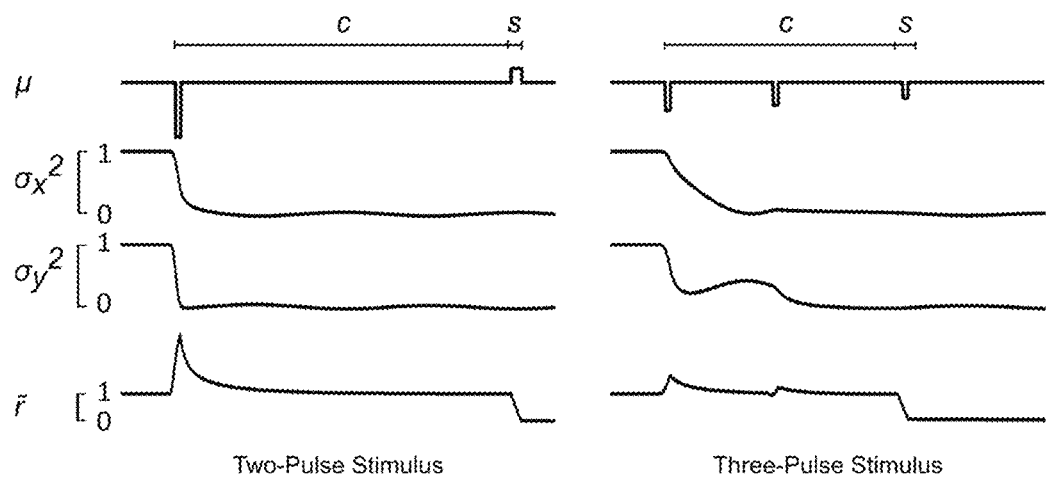
FIG. 19 illustrates findings for optimal two-pulse and three-pulse stimuli (top) also demonstrate that the stimulus first reduces the variances (second and third row), followed by suppression of the radius (bottom).

This resulting mechanism can also be seen in the optimal two-pulse and three-pulse rectangular stimulus waveforms that the inventors found through the systematic grid search as seen in FIGS. 18 and 19. A strong pulse is first given to achieve a narrow range of new phases regardless of the applied phase, and a weaker second stimulus is then given at the critical phase required to push the clocks past the unstable limit cycle into the attraction basin of the stable fixed point. With two pulses, a much stronger stimulus is required to corral the clocks into a narrow phase ($L^2$-norm of 3.342), while with three pulses ($L^2$-norm of 1.012), the first two stimuli corral the clocks more gradually and efficiently to achieve the same outcome. As a point of comparison, the optimal waveform achieved using EDA, shown in FIG. 16, has an $L^2$-norm of 0.2151.

FIG. 18 shows two-pulse stimulation (left) requires more energy than three-pulse stimulation (right). Phase amplitude resetting maps are shown (top) for specified time markers seen in both the system's response (middle) as well as the stimulus (bottom) plots. Note that the two-pulse stimulus spans one-cycle length, while the three-pulse stimulus spans only 0.71-cycle lengths.

FIG. 19 shows findings for optimal two-pulse and three-pulse stimuli (top) also demonstrate that the stimulus first reduces the variances (second and third row), followed by suppression of the radius (bottom). Corresponding corralling interval (c) and the suppressing interval (s) are shown above the stimulus.

Adjusting System and Stimulus Parameters

Given that the first part of the stimulus corrals the clocks into one phase region, the inventors would expect that the more time given, up to a certain point, the more gradually this corralling process could take place, and thus less energy would be required. Moreover, this fundamental of a phase reset followed by a suppressive stimulus should also work regardless of how wide or narrow the unstable limit cycle is. If the unstable limit cycle is larger, or further away from the stable fixed point, the corralling of clocks is not required to the same degree as if the unstable limit cycle was smaller.

Figure 20:
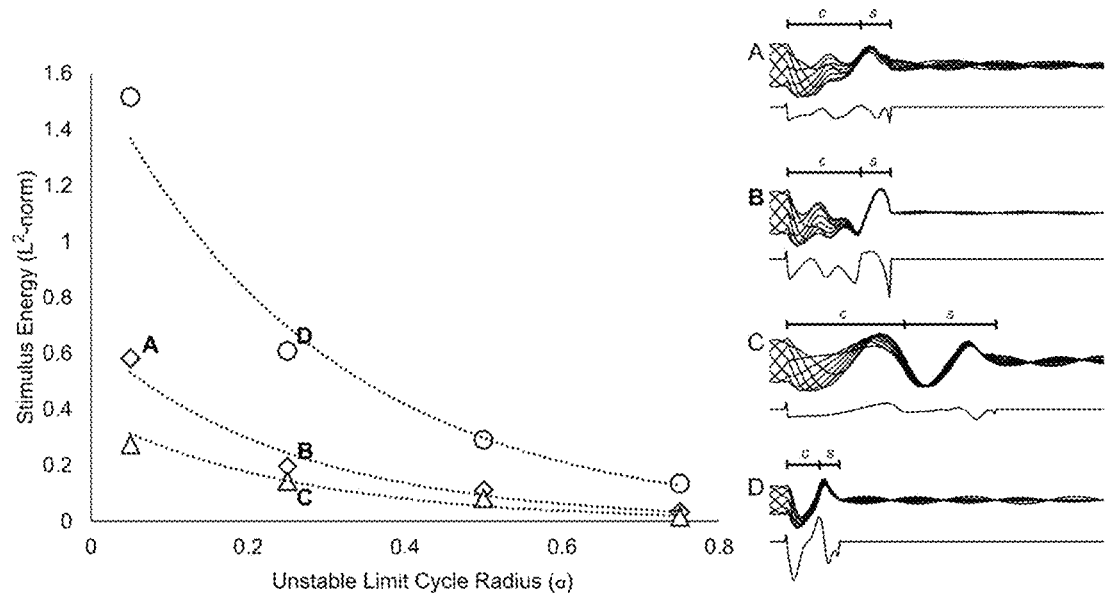
FIG. 20 illustrates the optimal stimuli of half-cycle length (triangles), one-cycle length (diamonds), and two-cycle lengths (circles) are plotted across varying widths of the unstable limit cycle (left).

The inventors tested these hypotheses by using EDA to find both optimal stimuli under different cycle length constraints as well as under different unstable limit cycle paradigms. As seen in FIG. 20, the $L^2$-norm of the optimal stimulus improves when increasing the stimulus duration (i.e. from half-cycle, to two-cycle length stimuli) and when widening the unstable limit cycle. As the stimulus duration lengthens, EDA finds a solution that leverages the attraction of the stable limit cycle to help corral the clocks further before the weaker suppression stimulus is applied to knock them into the stable fixed point's basin of attraction. Furthermore, when the unstable limit cycle is widened, the clocks do not need to be corralled to the same degree, and thus less energy is required.

FIG. 20 illustrates the optimal stimuli of half-cycle length (triangles), one-cycle length (diamonds), and two-cycle lengths (circles) are plotted across varying widths of the unstable limit cycle (left). A few system responses and stimulus waveforms are displayed on the right: (A) one-cycle length, a=0.05, (B) one-cycle length, a=0.25, (C) two-cycle length, a=0.25, and (D) half-cycle length, a=0.25. The corralling interval (c) and the suppressing interval (s) are marked for each stimulus.

It is well known that rhythmic activity of biological oscillators can be switched to an arrhythmic state in response to a stimulus pulse timed within a narrow phase window. In this study, the inventors have relaxed the constraint of perturbing with a single pulse to develop more complex waveforms that suppress oscillatory activity regardless of the phase at which the stimulus is given. The results reveal that in that the phase-agnostic stimulus suppresses oscillation in two distinct sequences. First, the clock's initial phase is shifted by the stimulus to a new phase within a narrow window. Following this corralling interval, the stimulus then perturbs the system across the unstable limit cycle. the inventors find that these two sequences can be achieved using two or more rectangular pulses, but relaxing the constraint from rectangular pulses to more complex waveforms allows for large energy savings in the form of reduced $L^2$-norm.

What is interesting to note is that even when examining two-pulse stimulation versus three pulse stimulation, the inventors can see a dramatic energy reduction. Visualizing the effect of the stimulus on superimposed clocks in state space, the inventors observe that the use of only two pulses limits the corralling portion of the stimulus to only one pulse. By allowing for a second pulse to aid in the corralling of the clocks, the three-pulse stimulus leverages the natural attraction of the stable limit cycle to further bring the clocks into a narrow phase region, thus requiring much less energy. Examining the complex waveform discovered through EDA, the inventors can see that even more energy is saved by using waveforms that enable the clocks to move more closely along the limit cycle while corralling to the narrow range of new phases, exploiting the intrinsic dynamics of the attracting limit cycle. The effect of a longer duration length stimulus confirms this finding even more when observing the reduction in $L^2$-norm of the two-cycle length stimulus as compared to the one-cycle length stimulus and half-cycle length stimulus.

If the unstable limit cycle is large, the requirement to corral the clocks is relaxed, while a narrow unstable limit cycle requires more energy in order to tightly pack the clocks into a narrow phase region. In the radial isochron clock, this unstable limit cycle is symmetrical across all dimensions. Most real systems in biology are governed by high dimensional asymmetrical dynamics. It will be interesting to investigate more complex models. How do symmetry and shape of the unstable limit cycle affect access and efficiency of suppressing oscillation using phase-agnostic perturbations?

The use of double-pulse stimulation has been examined previously in systems of coupled oscillators. Tass applied double-pulse stimuli to desynchronize a group of coupled synchronized oscillators[9], using a similar mechanism to what the inventors have observed. The first pulse reset the collective oscillations irrespective of the initial conditions, while the second pulse caused the desynchronization by targeting the vulnerable state achieved by the first pulse. The two pulses successfully desynchronize a coupled oscillator system regardless of when the stimulus is given. It will be interesting to investigate whether similar desynchronization can be induced with even greater efficiency using more complex waveforms.

By incorporating more pulses and new waveform shapes, the inventors open further discovery of efficient stimuli that suppress oscillations when given at any phase. Further research will be necessary to determine whether the mechanisms illustrated in this report are generic and applicable to biological systems or if modifications are necessary to understanding whether phase-agnostic solutions exist for more complex systems. Given the recent interest in electrical stimulation, or electroceutical, therapies to disrupt pathological oscillations in the brain[10,11], a better understanding of the mechanisms behind phase-agnostic waveforms may provide researchers and clinicians with improved therapeutic protocols for treatment.

All of the devices, systems and/or methods disclosed and claimed herein can be made and executed without undue experimentation in light of the present disclosure. While the devices, systems and methods of this invention have been described in terms of particular embodiments, it will be apparent to those of skill in the art that variations may be applied to the devices, systems and/or methods in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

1. Jirsa, V. K., Stacey, W. C., Quilichini, P. P., Ivanov, A. I. & Bernard, C. On the nature of seizure dynamics. Brain 137, 2210-2230 (2014).
2. Cressman, J. R., Ullah, G., Ziburkus, J., Schiff, S. J. & Barreto, E. The influence of sodium and potassium dynamics on excitability, seizures, and the stability of persistent states: I. Single neuron dynamics. J. Comput. Neurosci. 26, 159-170 (2009).
3. Lopes da Silva, F. et al. Epilepsies as dynamical diseases of brain systems: basic models of the transition between normal and epileptic activity. Epilepsia 44 Suppl 1, 72-83 (2003).
4. Rubin, J. & Terman, D. High frequency stimulation of the subthalamic nucleus eliminates pathological thalamic rhythmicity in a computational model. J. Comput. Neurosci. 16, 211-235 (2004).
5. Hammond, C., Bergman, H. & Brown, P. Pathological synchronization in Parkinson's disease: networks, models and treatments. Trends Neurosci. 30, 357-64 (2007).
6. Tass, P. A. A model of desynchronizing deep brain stimulation with a demand-controlled coordinated reset of neural subpopulations. Biol. Cybern. 89, 81-88 (2003).
7. Keener, J. & Panfilov, A. A biophysical model for defibrillation of cardiac tissue. Biophys. J. 71, 1335-45 (1996).
8. Josephson, M. E. Josephson's Clinical Cardiac Electrophysiology: Techniques and Interpretations. (Wolters Kluwer, 2016).

9. Mines, G. R. On circulating excitations in heart muscle and their possible relation to tachycardia and fibrillation. Trans. R. Soc. Canada 8, 43-52 (1914).
10. Schiff, S. J. Towards model-based control of Parkinson's disease. Philos. Trans. A. Math. Phys. Eng. Sci. 368, 2269-308 (2010).
11. Hofmann, L., Ebert, M., Tass, P. A. & Hauptmann, C. Modified pulse shapes for effective neural stimulation. Front. Neuroeng. 4, 9 (2011).
12. Guttman, R., Lewis, S. & Rinzel, J. Control of repetitive firing in squid axon membrane as a model for a neuroneoscillator. J. Physiol. 305, 377-395 (1980).
13. Paydarfar, D. & Eldridge, F. L. Phase resetting and dysrhythmic responses of the respiratory oscillator. Am. J. Physiol.—Regul. Integr. Comp. Physiol. 252, 55-62 (1987).
14. Winkle, R., Stinson, E., Bach, S. & Echt, D. Measurement of cardioversion/defibrillation thresholds in man by a truncated exponential waveform and an apical patch-superior vena caval spring electrode. Circulation 69, 766-71 (1984).
15. Fishler, M. G. Theoretical predictions of the optimal monophasic and biphasic defibrillation waveshapes. IEEE Trans. Biomed. Eng. 47, 59-67 (2000).
16. Malkin, R. A., Jackson, S. R., Nguyen, J., Yang, Z. & Guan, D. Experimental verification of theoretical predictions concerning the optimum defibrillation waveform. IEEE Trans. Biomed. Eng. 53, 1492-1498 (2006).
17. Jalife, J. & Antzelevitch, C. Phase Resetting and Annihilation of Pacemaker Activity in Cardiac Tissue. Science (80-.). 206, 695-697 (1979).
18. Winfree, A. T. Integrated View of Resetting a Circadian Clock. J. Theor. Biol. 28, 327-374 (1970).
19. Engelmann, W., Johnsson, A., Karlsson, H. G., Kobler, R. & Schimmel, M.-L. Attenuation of the Petal Movement Rhythm in Kalanchoe with Light Pulses. Physiol. Plant. 43, (1978).
20. Jewett, M. E., Kronauer, R. E. & Czeisler, C. A. Light-induced suppression of endogenous circadian amplitude in humans. Nature 350, 59-62 (1991).
21. Winfree, A. T. Oscillatory glycolysis in yeast: The pattern of phase resetting by oxygen. Arch. Biochem. Biophys. 149, 388-401 (1972).
22. Winfree, A. T. Phase Control of Neural Pacemakers. Science (80-.). 197, 761-763 (1977).
23. Winfree, A. T. The Geometry of Biological Time: Interdisciplinary Applied Mathematics. Springer vol. 24 (Springer-Verlag, 2001).
24. Yamanishi, J. ichi, Kawato, M. & Suzuki, R. Studies on human finger tapping neural networks by phase transition curves. Biol. Cybern. 33, 199-208 (1979).
25. Guckenheimer, J. Isochrons and phaseless sets. J. Math. Biol. 1, 259-273 (1975).
26. Best, E. N. Null space in the Hodgkin-Huxley Equations. A critical test. Biophys. J. 27, 87-104 (1979).
27. Krogh-Madsen, T., Glass, L., Doedel, E. J. & Guevara, M. R. Apparent discontinuities in the phaseresetting response of cardiac pacemakers. J. Theor. Biol. 230, 499-519 (2004).
28. FitzHugh, R. Impulses and Physiological States in Theoretical Models of Nerve Membrane. Biophys. J. 1, 445-466 (1961).
29. Nagumo, J., Arimoto, S. & Yoshizawa, S. An Active Pulse Transmission Line Simulating Nerve Axon. Proc. IRE 50, 2061-2070 (1962).
30. Chang, J. & Paydarfar, D. Falling off a limit cycle using phase-agnostic stimuli: Definitions and conceptual framework [Submitted Manuscript]. Chaos (2020).
31. Izhikevich, E. M. Dynamical Systems in Neuroscience: The Geometry of Excitability and Bursting. vol. 25 (MIT Press, 2007).
32. Suffczynski, P., Lopes da Silva, F., Parra, J., Velis, D. & Kalitzin, S. Epileptic transitions: model predictions and experimental validation. J Clin Neurophysiol 22, 288-299 (2005).
33. El Houssaini, K., Ivanov, A. I., Bernard, C. & Jirsa, V. K. Seizures, refractory status epilepticus, and depolarization block as endogenous brain activities. Phys. Rev. E—Stat. Nonlinear, Soft Matter Phys. 91, 2-6 (2015).
34. Glass, L. & Josephson, M. E. Resetting and annihilation of reentrant abnormally rapid heartbeat. Phys. Rev. Lett. 75, 2059-2062 (1995).
35. Chang, J. & Paydarfar, D. Evolution of extrema features reveals optimal stimuli for biological state transitions. Sci. Rep. 8, 3403 (2018).
36. Merrill, D. R., Bikson, M. & Jefferys, J. G. R. Electrical stimulation of excitable tissue: Design of efficacious and safe protocols. J. Neurosci. Methods 141, 171-198 (2005).
37. Suffczynski, P., Kalitzin, S. & Lopes Da Silva, F. H. Dynamics of non-convulsive epileptic phenomena modeled by a bistable neuronal network. Neuroscience 126, 467-484 (2004).
38. Motamedi, G. K. et al. Optimizing parameters for terminating cortical afterdischarges with pulse stimulation. Epilepsia 43, 836-846 (2002).
39. Cagnan, H. et al. Stimulating at the right time: Phase-specific deep brain stimulation. Brain 140, 132-145 (2017).

Hardware Discussion—pAWG References

[1] D. Paydarfar and J. Chang, "Application of the extrema distortion method to optimize control signals," U.S. Ser. No. 10/506,983B2, Sep. 25, 2017.
[2] J. Chang and D. Paydarfar, "Optimizing stimulus waveforms for suppressing epileptic activity reveals a counterbalancing mechanism," in *Proceedings of the Annual International Conference of the IEEE Engineering in Medicine and Biology Society, EMBS*, October 2018, vol. 2018-July, pp. 2226-2229, doi: 10.1109/EMBC.2018.8512762.
[3] A. Amon and F. Alesch, "Systems for deep brain stimulation: review of technical features," *Journal of Neural Transmission*, vol. 124, no. 9, pp. 1083-1091, September 2017, doi: 10.1007/s00702-017-1751-6.
[4] Raspberry Pi Foundation, "Raspberry Pi 3 Model B+." https://www.raspberrypi.org/products/raspberry-pi-3-model-b-plus/ (accessed Feb. 16, 2020).
[5] Analog Devices, "OP-07 Precision Operational Amplifier Datasheet." Accessed: Feb. 16, 2020. [Online]. Available: https://www.mouser.com/datasheet/2/609/OP07-ltc-1504381.pdf.
[6] NeuroPace Inc., "How the RNS® System Works," 2020. https://www.neuropace.com/the-rns-system/ (accessed Sep. 3, 2020).
[7] Medtronic, "Deep Brain Stimulation Systems—Percept PC," 2020. https://www.medtronic.com/us-en/healthcare-professionals/products/neurological/deep-brain-stimulation-systems/percept-pc.html (accessed Sep. 3, 2020).
[8] NeuroPace Inc., "RNS® System Physician Manual," 2020. Accessed: Sep. 3, 2020. [Online].

[9] M. Parastarfeizabadi and A. Z. Kouzani, "Advances in closed-loop deep brain stimulation devices," *Journal of NeuroEngineering and Rehabilitation*, vol. 14, no. 1, p. 79, December 2017, doi: 10.1186/s12984-017-0295-1.

[10] M. C. Lo and A. S. Widge, "Closed-loop neuromodulation systems: next-generation treatments for psychiatric illness," *International Review of Psychiatry*, vol. 29, no. 2. Taylor and Francis Ltd, pp. 191-204, Mar. 4, 2017, doi: 10.1080/09540261.2017.1282438.

[11] Medtronic, "Percept™ PC B35200 Neurostimulator with BrainSense™ Technology Implant manual Rx only," 2020. Accessed: Sep. 3, 2020. [Online].

[12] B. Piallat et al., "MONOPHASIC BUT NOT BIPHASIC PULSES INDUCE BRAIN TISSUE DAMAGE DURING MONOPOLAR HIGH-FREQUENCY DEEP BRAIN STIMULATION," *Neurosurgery*, vol. 64, no. 1, pp. 156-163, January 2009, doi: 10.1227/01.NEU.0000336331.88559.CF.

[13] S. F. Cogan, "Neural Stimulation and Recording Electrodes," *Annual Review of Biomedical Engineering*, vol. 10, no. 1, pp. 275-309, August 2008, doi: 10.1146/annurev.bioeng.10.061807.160518.

[14] D. R. Merrill, M. Bikson, and J. G. R. Jefferys, "Electrical stimulation of excitable tissue: Design of efficacious and safe protocols," *Journal of Neuroscience Methods*, vol. 141, no. 2. Elsevier, pp. 171-198, Feb. 15, 2005, doi: 10.1016/j.jneumeth.2004.10.020.

[15] F. Steigerwald, C. Matthies, and J. Volkmann, "Directional Deep Brain Stimulation," *Neurotherapeutics*, vol. 16, no. 1, pp. 100-104, January 2019, doi: 10.1007/s13311-018-0667-7.

[16] A. Merola et al., "Current Directions in Deep Brain Stimulation for Parkinson's Disease-Directing Current to Maximize Clinical Benefit," *Neurology and Therapy*. Adis, pp. 1-17, Mar. 9, 2020, doi: 10.1007/s40120-020-00181-9.

[17] R. Cubo, M. Fahlstrom, E. Jiltsova, H. Andersson, and A. Medvedev, "Calculating deep brain stimulation amplitudes and power consumption by constrained optimization," *Journal of Neural Engineering*, vol. 16, no. 016020, 2019, doi: https://doi.org/10.1088/1741-2552/aaeeb7.

[18] A. C. Willsie and A. D. Dorval, "Computational Field Shaping for Deep Brain Stimulation With Thousands of Contacts in a Novel Electrode Geometry," *Neuromodulation: Technology at the Neural Interface*, vol. 18, no. 7, pp. 542-551, October 2015, doi: 10.1111/ner.12330.

[19] A. Janson, D. Anderson, and C. Butson, "Activation robustness with directional leads and multi-lead configurations in deep brain stimulation," *Journal of Neural Engineering*, vol. 17, no. 026012, 2020, doi: https://doi.org/10.1088/1741-2552/ab7b1d.

[20] E. Pella et al., "Multi-objective particle swarm optimization for postoperative deep brain stimulation targeting of subthalamic nucleus pathways," *Journal of Neural Engineering*, vol. 15, no. 6, p. 066020, December 2018, doi: 10.1088/1741-2552/aae12f.

Reinforcement Learning References

Barto A G, Sutton R S (2017) Reinforcement learning: an introduction. MIT Press, Cambridge Bonaz B L, Bernstein C N (2013) Brain-gut interactions in inflammatory bowel disease. Gastroenterology 144(1):36-49

Brockman G, Cheung V, Pettersson L, Schneider J, Schulman J, Tang J, Zaremba W (2016) OpenAI Gym. arXiv preprint: arXiv:1606.01540

Cameron T (2004) Safety and efficacy of spinal cord stimulation for the treatment of chronic pain: a 20-year literature review. J Neurosurg Spine 100(3):254-267

Cassar I R, Titus N D, Grill W M (2017) An improved genetic algorithm for designing optimal temporal patterns of neural stimulation. J Neural Eng 14(6):066013

Chang J, Paydarfar D (2018) Evolution of extrema features reveals optimal stimuli for biological state transitions. Sci Rep 8:3403

Chang J, Paydarfar D (2018) Optimizing stimulus waveforms for electroceuticals. Biological Cybernetics 113(1-2):191-199

Dettling M, Lisanby S H (2008) Electroconvulsive therapy for depression. New Engl J Med 358(6):645-646

Herrington et al., (2016) J Neurophysiol. 2016 Jan. 1; 115(1): 19-38.

Hessel M, Modayil J, van Hasselt H, Schaul T, Ostrovski G, Dabney W, Horgan D, Piot B, Azar M, Silver D (2017) Rainbow: Combining Improvements in Deep Reinforcement Learning. AAAI:arXiv:1710.02298

Hodgkin A, Huxley A (1952) A quantitative description of membrane current and its application to conduction and excitation in nerve. J Physiol 52(4):500-544

Jimenez F, Velasco F, Salin-Pascual R, Hernandez J A, Velasco M, Criales J L, Nicolini H (2005) A patient with a resistant major depression disorder treated with deep brain stimulation in the inferior thalamic peduncle. Neurosurgery 57(3):585-592

Kim J, Shlizerman E (2020) Deep Reinforcement Learning for Neural Control. arXiv preprint:arXiv:2006.07352

Kuncel A M, Grill W M (2004) Selection of stimulus parameters for deep brain stimulation. Clin Neurophysiol 115(11):2431-2441

Lapan M (2018). Deep Reinforcement Learning Hands-On. Packt Publishing

Lillicrap T P, Hunt J J, Pritzel A, Heess N, Erez T, Tassa Y, Silver D, Wierstra D (2015) Continuous control with deep reinforcement learning. ICLR:arXiv:1509.02971

Lizotte D J, Bowling M, Murphy S A (2010) Efficient Reinforcement Learning with Multiple Reward Functions for Randomized Controlled Trial Analysis. ICML:695-702

Lozano A M, Mayberg H S, Giacobbe P, Hamani C, Craddock R C, Kennedy S H (2008) Subcallosal cingulate gyrus deep brain stimulation for treatment-resistant depression. Biol Psychiatry 64(6):461-467

Matheron G, Perrin N, Sigaud 0 (2019) The problem with DDPG: understanding failures in deterministic environments with sparse rewards. arXiv preprint:arXiv:1911.11679

Meregnani J, Clarençon D, Vivier M, Peinnequin A, Mouret C, Sinniger V, Picq C, Job A, Canini F, Jacquier-Sarlin M, Bonaz B (2011) Anti-inflammatory effect of vagus nerve stimulation in a rat model of inflammatory bowel disease. Auton Neurosci Basic Clin 160(1-2):82-89

Oakley J C, Prager J P (2002) Spinal cord stimulation: mechanisms of action. Spine 27(22):2574-2583

Schulman J, Wolski F, Dhariwal P, Radford A, Kilmov O (2017) Proximal Policy Optimization Algorithms. arXiv preprint:arXiv:1707.06347

Silver D, Lever G, Heess N, Degris T, Wierstra D, Riedmiller M (2014) Deterministic policy gradient algorithms. ICML:I-387-I-395

Shelton C R (2001) Balancing Multiple Sources of Reward in Reinforcement Learning. Advances in neural processing systems Shorvon S D, Andermann F, Guerrini R. (ed.). 2011. The causes of epilepsy. Cambridge University Press, Cambridge.

Thomas P S, Branicky M, van den Bogert A, Jagodnik K (2008) Creating a Reinforcement Learning Controller for Functional Electrical Stimulation of a Human Arm.

Uhlenbeck G. E., Ornstein L. S. (1930) On the Theory of the Brownian Motion. Phys. Rev. 36, 823. doi:10.1103/PhysRev.36.823 van Maanen M A, Vervoordeldonk M J, Tak P P (2009) The cholinergic anti-inflammatory pathway: towards innovative treatment of rheumatoid arthritis. Nat Rev Rheumatol 5:229-232

Wilson D, Moehlis J (2016) Toward a more efficient implementation of antifibrillation pacing. PLoS ONE 11(7):1-28

Zhang Z (2019) Reinforcement learning in clinical medicine: a method to optimize dynamic treatment regime over time. Annals of Translational Medicine. doi: 10.21037/atm.2019.06.75

Isochron Clock References

1. Winfree, A. T. *The Geometry of Biological Time*. (Springer-Verlag, 2001).
2. Glass, L. & Mackey, M. C. *From Clocks to Chaos: The Rhythms of Life*. (Princeton University Press, 1988).
3. Cagnan, H. et al. Stimulating at the right time: phase-specific deep brain stimulation. *Brain* 140, 132-145 (2017).
4. Chang, J. & Paydarfar, D. Switching neuronal state: optimal stimuli revealed using a stochastically-seeded gradient algorithm. *J. Comput. Neurosci.* 37, 569-582 (2014).
5. Forger, D. B., Paydarfar, D. & Clay, J. R. Optimal stimulus shapes for neuronal excitation. *PLoS Comput. Biol.* 7, e1002089 (2011).
6. Grill, W. Model-based analysis and design of waveforms for efficient neural stimulation. *Prog. Brain Res.* 222, 147-162 (2015).
7. Chang, J. & Paydarfar, D. Evolution of extrema features reveals optimal stimuli for biological state transitions. *Sci. Rep.* 8, 3403 (2018).
8. Forger, D. B. & Paydarfar, D. Starting, stopping, and resetting biological oscillators: In search of optimum perturbations. *J. Theor. Biol.* 230, 521-532 (2004).
9. Tass, P. A. Effective desynchronization by means of double-pulse phase resetting. *Europhys. Lett.* 53, 15-21 (2001).
10. Famm, K., Litt, B., Tracey, K. J., Boyden, E. S. & Slaoui, M. A jump-start for electroceuticals. *Nature* 496, 159-61 (2013).
11. Majid, A. *Electroceuticals: Advances in Electrostimulation Therapies*. (Springer International Publishing AG, 2017).

The invention claimed is:

1. An apparatus for applying a therapeutic treatment to a subject, the apparatus comprising:
a stimulation electrode; and
a programmable arbitrary waveform generator, wherein the programmable arbitrary waveform generator is configured to:
receive a detected biological oscillator signal from the subject;
transmit a first stimulation signal to the subject via the stimulation electrode, wherein the first stimulation signal is transmitted at a phase of the detected biological oscillator signal;
receive a response signal from the subject; and
transmit a second stimulation signal to the subject via the stimulation electrode, wherein the second stimulation signal is configured to optimize the response signal without regard to the phase of the detected biological oscillator signal by suppressing oscillation in the detected biological oscillator signal while minimizing an electrical current level of the second stimulation, wherein:
the second stimulation signal is generated using an extrema distortion algorithm, a deep learning algorithm or a reinforcement learning algorithm.

2. The apparatus of claim 1 wherein the detected biological oscillator signal is received from a detection electrode.

3. The apparatus of claim 2 wherein the detection electrode is a separate component coupled to the apparatus.

4. The apparatus of claim 2 wherein the detection electrode is integral to the apparatus.

5. The apparatus of claim 1 wherein the programmable arbitrary waveform generator is configured to:
receive a second response signal generated by the second stimulation signal;
transmit a third stimulation signal via the stimulation electrode, wherein the third stimulation is transmitted at a phase of the second response signal;
receive a third response signal from the subject; and
transmit a fourth stimulation signal to the subject via the stimulation electrode, wherein the fourth stimulation signal is configured to optimize the second response signal without regard to the phase of the third response signal.

6. The apparatus of claim 5 wherein the programmable arbitrary waveform generator is configured to apply subsequent stimulation signals and receive subsequent response signals in an iterative process.

7. The apparatus of claim 1 wherein the first stimulation signal and the second stimulation signal are complex waveforms.

8. The apparatus of claim 1 wherein the first stimulation signal and the second stimulation signal are deep brain stimulation signals.

9. The apparatus of claim 8 wherein the deep brain stimulation signals are directional deep brain stimulation signals.

10. The apparatus of claim 9 wherein the deep brain stimulation signals are configured for treatment of Parkinson's disease.

11. The apparatus of claim 9 wherein the deep brain stimulation signals are configured for treatment of epilepsy or a seizure disorder.

12. The apparatus of claim 11, wherein the deep brain stimulation signals are configured for treatment of absence seizures, tonic seizures, atonic seizures, clonic seizures, myoclonic seizures, or tonic-clonic seizures.

13. The apparatus of claim 1 wherein the first stimulation signal and the second stimulation signal are cardiac stimulation signals.

14. The apparatus of claim 13, wherein the cardiac stimulation signals are configured for treatment of a cardiac arrythmia.

15. An apparatus for applying a therapeutic treatment to a subject, the apparatus comprising:
a detection module;
a transmission module; and a waveform generator, wherein the waveform generator is configured to:
  receive a detected biological oscillator signal from the subject via the detection module;
  transmit a first stimulation signal to the subject via the transmission module;
  receive a first response biological oscillator signal from the subject via the detection module;
  transmit a second stimulation signal to the subject via the transmission module; and
  receive a second response biological oscillator signal from the subject via the detection module, wherein:
    the second stimulation signal is configured to optimize the first response signal by suppressing oscillation in the second response biological oscillator signal while minimizing an electrical current level of the second stimulation signal; and
    the first stimulation signal and the second stimulation signal are applied in a phase agnostic manner, wherein:
      the second stimulation signal is generated using an extrema distortion algorithm, a deep learning algorithm or a reinforcement learning algorithm.

16. A method of treating a disease in a mammalian subject, the method comprising:
  receiving an oscillating electrical signal from a subject;
  applying a first stimulation signal to the subject at a phase window of the oscillating electrical signal, wherein the first stimulation signal modifies the oscillating electrical signal from the subject to produce a response signal;
  receiving the response signal from the subject; and
  applying a second stimulation signal to the subject, wherein the second stimulation signal is configured to optimize the response signal without regard to the phase window of the oscillating electrical signal by suppressing oscillation in the response signal while minimizing an electrical current level of the second stimulation, wherein:
    the second stimulation signal is generated using an extrema distortion algorithm, a deep learning algorithm or a reinforcement learning algorithm.

17. A method of applying a therapeutic treatment to a subject, comprising:
  applying an electrical stimulation to the subject;
  receiving feedback from the subject in response to said electrical stimulation;
  adjusting said electrical stimulation based at least in part on said feedback, where the adjustment includes a change of the electrical stimulation waveform and comprises one or more of a change to phase, amplitude, timing, duration, shape; and
  applying the adjusted electrical stimulation to the subject, wherein:
    the adjusted electrical stimulation is generated using an extrema distortion algorithm, a deep learning algorithm or a reinforcement learning algorithm; and
    the adjusted electrical stimulation suppresses oscillation in the feedback while minimizing an electrical current level of the adjusted electrical stimulation.

* * * * *